United States Patent
Lee et al.

(10) Patent No.: US 8,190,004 B2
(45) Date of Patent: May 29, 2012

(54) RECORDING/PLAYING DEVICE AND METHOD FOR PROCESSING BROADCAST SIGNAL

(75) Inventors: Kwan Hee Lee, Gyeonggi-do (KR); Woo Hyun Paik, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 724 days.

(21) Appl. No.: 12/355,283

(22) Filed: Jan. 16, 2009

(65) Prior Publication Data

US 2009/0185788 A1    Jul. 23, 2009

(30) Foreign Application Priority Data

Jan. 17, 2008   (KR) .................. 10-2008-0005471

(51) Int. Cl.
*H04N 5/93* (2006.01)
*H04N 5/765* (2006.01)

(52) U.S. Cl. ...................... 386/353; 386/200

(58) Field of Classification Search .............. 386/291, 386/296, 299, 297, 200, 231
See application file for complete search history.

(56) References Cited

U.S. PATENT DOCUMENTS

| | | |
|---|---|---|
| 2001/0005900 A1 | 6/2001 | Yoshida et al. |
| 2005/0278774 A1 | 12/2005 | Eshleman et al. |
| 2009/0102983 A1 * | 4/2009 | Malone et al. ............... 348/734 |

FOREIGN PATENT DOCUMENTS

| | | |
|---|---|---|
| JP | 2001-160940 A | 6/2001 |
| KR | 10-2003-0095138 A | 12/2003 |
| KR | 10-2005-0101767 A | 10/2005 |

* cited by examiner

*Primary Examiner* — Robert Chevalier
(74) *Attorney, Agent, or Firm* — Birch, Stewart, Kolasch & Birch, LLP

(57) ABSTRACT

A recording/playing device and a method for processing a broadcast signal are disclosed. The device includes an external storage device, and a broadcast receiver. The external storage device includes at least one storage medium. And, the broadcast receiver includes a broadcast processor, an interface unit, and a record/play controlling unit. The broadcast processor receives a broadcast signal of a specific channel and demodulates and decodes the received broadcast signal. The interface unit is capable of being connected to the storage medium of the external storage device. And, the record/play controlling unit activates a record/play mode, when a connection with the storage medium of the external storage device is detected through the interface unit, and stores the demodulated broadcast signal in the storage medium of the external storage device through the interface unit, or reads and plays (or plays-back) the broadcast signal from the storage medium of the external storage device.

11 Claims, 28 Drawing Sheets

FIG. 4

Do you wish to activate DVR mode?

| Yes | No |

FIG. 8

| Preamble/SFD | Destination address | Source address | Data length | Data | Checksum |
|---|---|---|---|---|---|
| 7+1 bytes | 6 bytes | 2 bytes | 6 bytes | 46~1500 bytes | 4 bytes |

FIG. 9

| Programme Guide | | | | |
|---|---|---|---|---|
| ⊡ CBBC Channel | | | | 14:35  3 Apr |
| TV | 11 Apr | | | |
| | 14:30 | 15:00 | 15:30 | |
| 6. CBBC Channel | The Tr.. | Story of Tra.. | ⏲ Animadness.. | ▶ |
| 1. BBC ONE | Mona The Va.. | The Wild | Thor The Wild Tho.. | ▶ |
| 2. BBC TWO | ⏲ Racing | A BBC News Sp.. | BBC News | ▶ |
| 3. BBC THREE | This is BBC TH | Welcome Welcome To.. | | ▶ |
| 4. BBC NEWS 24 | BBC | BBC News | BBC News | ▶ |
| 5. BBCi | BBC i | Racing News | Welcome To | ▶ |
| 7. BBC1 London | Racing | BBC TH | ⏲ The Wild Thorr.. | ▶ |
| | ▼ Next Page | | | |
| Tv/Radio     ○ Favorite     ○ Pr. Change     ○ Information | | | | |
| ○ Mode     ○ Date     ○ Manual Timer     ○ Timer List | | | | |

FIG. 12

| Record list | Page 1/3 | ☑ No selection | | |
|---|---|---|---|---|
| External storage medium part1 | TEST F01F01 04/04(TUE) New 00:01 | | TEST F01F02 02/02(THU) Complete 21:59 | |
| Remaining storage capacity 0MB | TEST F01F03 05/05(FRI) New 00:02 | | TEST F01F04 01/01(SUN) New 00:01 | |
| Internal storage medium | TEST F01F05 03/03(FRI) New 00:01 | | TEST F01F06 06/06(TUE) Part 00:01 | |
| External storage medium | TEST F01F07 07/07(FRI) New 00:01 | | TEST F01F08 08/08(TUE) New 00:01 | |
| | TEST F01F09 09/09(SAT) New 00:02 | | TEST F01F10 10/10(TUE) New 00:02 | |
| ⌂ Home   ○ Move   ○ File menu   ○ Page shift   ○ Selection   ○ Exit | | | | |

FIG. 13

| Record list | Page 1/3 | ☑ No selection | |
|---|---|---|---|
| External storage medium part1 | TEST F01F01 04/04(TUE) | external input1 4:10 PM ~ 12:00 AM  First play  Previous play  Total selection  Delete  Reservation play  Information Edit  Close | F02 2(THU) Complete 21:59 |
| Remaining storage capacity 0MB | TEST F01F03 05/05(FRI) | | F04 1(SUN) New 00:01 |
| Internal storage medium  External storage medium | TEST F01F05 03/03(FRI) | | F06 6(TUE) Part 00:01 |
| | TEST F01F07 07/07(FRI) New 00:01 | TEST F01F08 08/08(TUE) New 00:01 | |
| | TEST F01F09 09/09(SAT) New 00:02 | TEST F01F10 10/10(TUE) New 00:02 | |

⌂ Home   ○ Move   ○ File menu   ○ Page shift   ○ Selection   ○ Exit

FIG. 15A

| 1 | 2 | 3 | 4 | 5 | 6 | 7 | 8 | 9 | 10 | 11 |
|---|---|---|---|---|---|---|---|---|----|----|
| A | V | V | V | A | D | D | D | A | D  | V  |

FIG. 15B

| Time Stamp | 1 | 2 | 3 | 4 | 5 | 9 | 11 |
|---|---|---|---|---|---|---|---|
| Stored data | A | V | V | V | A | A | V |

FIG. 15C

| 1 | 2 | 3 | 4 | 5 | 6 | 7 | 8 | 9 | 10 | 11 |
|---|---|---|---|---|---|---|---|---|----|----|
| A | V | V | V | A | N | N | N | A | N  | V  |

FIG. 19C
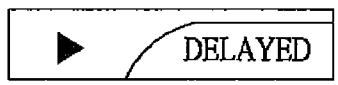
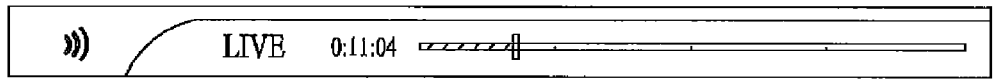
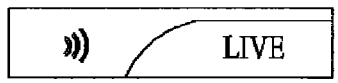
FIG. 20
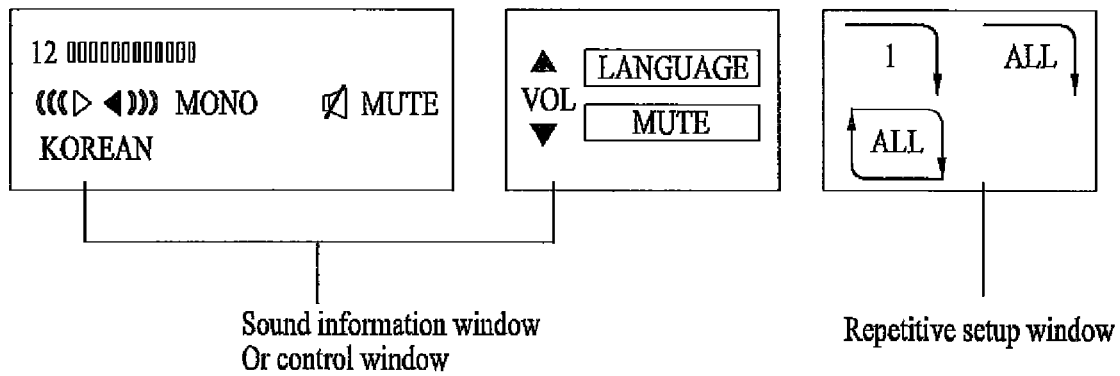
Sound information window
Or control window
Repetitive setup window

FIG. 25

Do you wish to execute time-shift?

| Yes | No |

RECORDING/PLAYING DEVICE AND METHOD FOR PROCESSING BROADCAST SIGNAL

This application claims the benefit of the Korean Patent Application No. 10-2008-0005471, filed on Jan. 17, 2008, which is hereby incorporated by reference as if fully set forth herein.

BACKGROUND OF THE INVENTION

1. Field of the Invention

The present invention relates to a recording/playing device that can receive, store, and reproduce (or play) a broadcast signal, and more particularly, to a recording/playing device and a method for processing a broadcast signal that can receive a broadcast signal and store the received signal in an external storage unit in wireless/wired connection with a broadcast receiving system.

2. Discussion of the Related Art

One of the most currently popular digital television (TV) application services relates to equipping a storage medium, such as a hard disk drive (HDD), to a broadcast receiver (or receiving system), so as to provide viewers with additional convenient functions. At this point, various trick plays may be performed on the broadcast signal stored in the HDD. More specifically, apart from the regular (or normal) rate play, trick plays such as slow play, fast play, and reverse play may be supported. In order to perform a trick play, when storing the broadcast signal, characteristics of a video bit stream are extracted, so as to create index data that are correlated, which are stored along with the broadcast signal. Then, when playing the broadcast signal, reference is made to the stored index data, thereby being capable of performing the many trick plays that satisfy the viewer's request.

However, in the related art, by equipping the broadcast receiver with expensive HDD, the fabrication cost of the broadcast receiver inevitably increases. Also, when using a broadcast receiver with embedded (or built-in) HDD, and when a malfunction or error occurs in the HDD, the manufacturer of the broadcast receiver is also responsible for the maintenance and management of the embedded HDD. Therefore, the related art is disadvantageous in that the manufacturer must undergo the inconvenience of after service (A/S) and be responsible for the payment of additional A/S costs. Additionally, since the inside of the broadcast receiver is densely packed, the receiver may lack the space for being equipped with additional HDD. Furthermore, since the HDD is fixed inside the broadcast receiver in an irretrievable condition, the user is incapable of separating (or detaching) the HDD from the main body on his or her own. Therefore, when an error occurs, the problematic HDD may only be replaced by the work of professional maintenance personnel. Accordingly, increasing the storage capacity of the HDD is practically impossible in the related art. Finally, a broadcast signal stored in the HDD of the related art broadcast receiver may only be played (or reproduced) by the corresponding broadcast receiver. Therefore, the corresponding broadcast signal cannot be transferred and played through a different medium.

SUMMARY OF THE INVENTION

Accordingly, the present invention is directed to a recording/playing device and a method for processing a broadcast signal that substantially obviate one or more problems due to limitations and disadvantages of the related art.

An object of the present invention is to provide a recording/playing device and a method for processing a broadcast signal that can record and play a broadcast signal without requiring a storage medium to be equipped therein, by connecting the broadcast receiver to an external storage medium via wireless/wired connection, and by storing the broadcast signal in the connected storage medium and playing the stored broadcast signal.

Another object of the present invention is to provide a recording/playing device and a method for processing a broadcast signal that can record and play a broadcast signal without requiring a storage medium to be equipped therein, and by storing the broadcast signal in an external storage medium connected to a universal serial bus (USB) port of the broadcast receiver and playing the stored broadcast signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording/playing device includes an external storage device, and a broadcast receiver. The external storage device includes at least one storage medium. And, the broadcast receiver includes a broadcast processor, an interface unit, and a record/play controlling unit. Herein, the broadcast processor receives a broadcast signal of a specific channel and demodulates and decodes the received broadcast signal. The interface unit is capable of being connected to the storage medium of the external storage device. And, the record/play controlling unit activates (or enables) a record/play mode, when a connection with the storage medium of the external storage device is detected through the interface unit, and stores the demodulated broadcast signal in the storage medium of the external storage device through the interface unit, or reads and plays (or playsback) the broadcast signal from the storage medium of the external storage device.

Herein, the interface unit may include at least one universal serial bus (USB) port that is capable of being connected to the storage medium of the external storage device, and the storage medium of the external storage device may be connected to the USB port through any one of a cable connection and a wireless connection. Also, each of the interface unit and the external storage device may further include a wireless transmitting/receiving device wirelessly transmitting and receiving the broadcast signal, when the storage medium of the external storage device is connected to the interface unit.

Furthermore, the interface unit may include at least one local area network (LAN) card capable of being connected to the storage medium of the external storage device via Ethernet, and wherein the storage medium of the external storage device may be connected to the LAN card of the interface unit through any one of a cable connection and a wireless connection. Each of the interface unit and the external storage device may further include a wireless transmitting/receiving device wirelessly transmitting and receiving the broadcast signal, when the storage medium of the external storage device is connected to the interface unit.

Additionally, the record/play controlling unit may encrypt the demodulated and inputted broadcast signal and store the encrypted broadcast signal in the storage medium of the external storage device through the interface unit. When the encrypted broadcast signal stored in the storage medium of the external storage device is inputted through the interface unit, the record/play controlling unit may decrypt and decode the received broadcast signal and output the processed broadcast signal to the broadcast processor, so as to be displayed. Also, when a record/play mode is activated and when a time-shift mode is turned on, the record/play controlling unit may store the demodulated and inputted broadcast signal in a time-shift storage region in the storage medium of the external storage device through the interface unit. Finally, the record/play controlling unit may display a time-shift guide on-screen display (OSD) indicating a status of the broadcast signal being stored in the time-shift storage region. Herein, when a play-start point is selected from the time-shift guide OSD through an input device, the record/play controlling unit may read and play the broadcast signal stored in the time-shift storage region starting from the selected play-start point.

In another aspect of the present invention, a method for processing a broadcast signal of a recording/playing device includes receiving a broadcast signal of a specific channel and demodulating and decoding the received broadcast signal, activating a record/play mode, when an external connection with a storage medium via any one of a cable connection and a wireless connection is detected, and, when the record/play mode is activated, storing the demodulated broadcast signal in the externally connected storage medium, or reading and playing the broadcast signal from the externally connected storage medium.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an exemplary message for selecting activation status of the DVR mode according to the present invention;

FIG. 8 illustrates an Ethernet MAC frame according to an embodiment of the present invention;

FIG. 9 illustrates an EPG output format according to an embodiment of the present invention;

FIG. 12 illustrates a record list of recorded content stored in the external storage medium according to the present invention;

FIG. 13 illustrates an exemplary method for selecting a program that is to be played from the record list according to the present invention;

FIG. 15A to FIG. 15C respectively illustrate a method for storing a program and playing the stored program according to the present invention;

FIG. 19A to FIG. 19C respectively illustrate exemplary visual indicators and mode text information according to the present invention;

FIG. 20 illustrates other exemplary on-screen displays that can be displayed on a display screen according to the present invention;

FIG. 25 illustrates an exemplary message for selecting time-shift execution status according to the present invention.

DETAILED DESCRIPTION OF THE INVENTION

Figure 1:
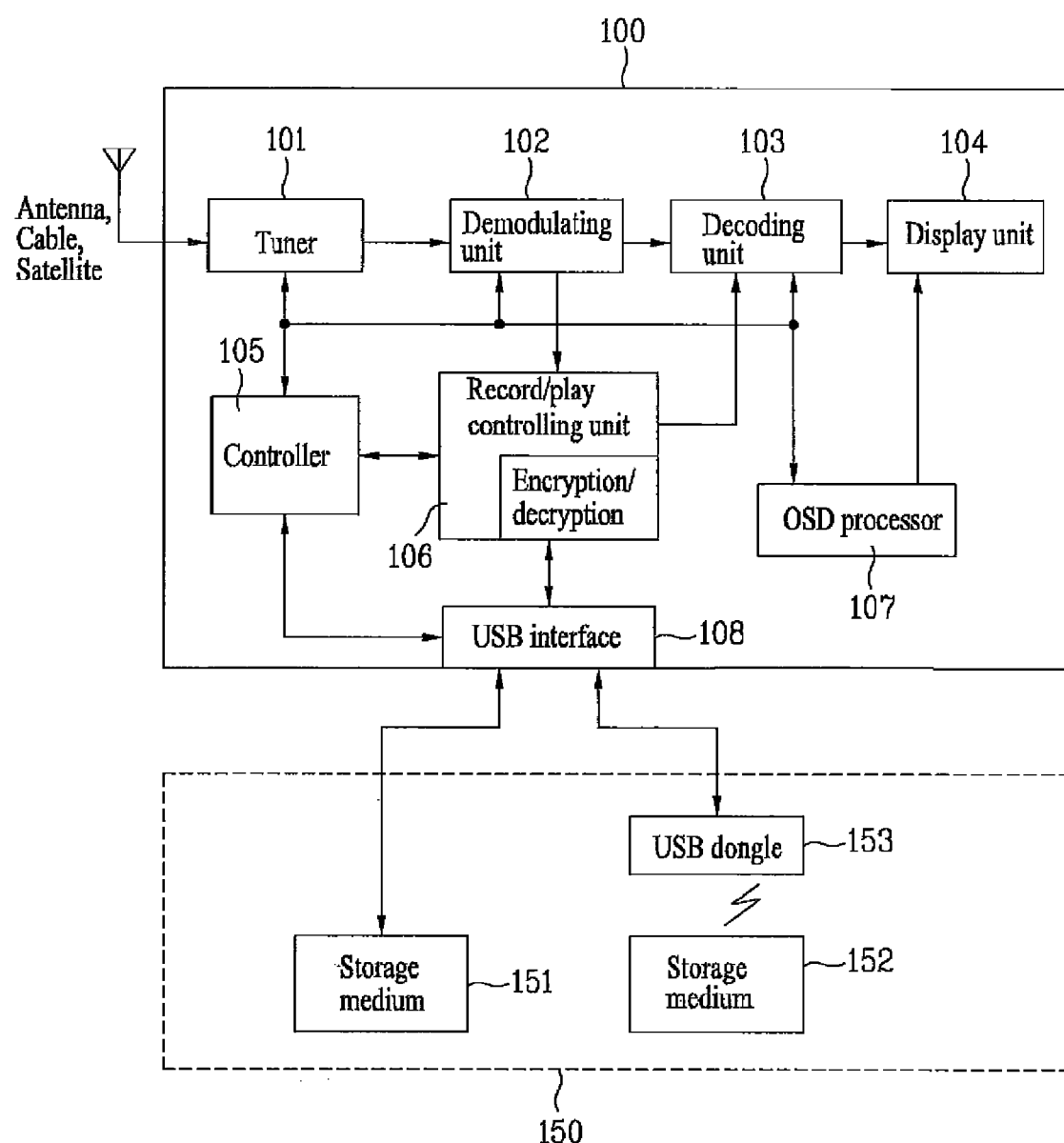
FIG. 1 illustrates a block diagram showing the structure of a recording/playing device including a broadcast receiver according to a first embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

The first embodiment of the present invention relates to providing a broadcast receiver provided with at least one universal serial bus (USB) port, to storing a broadcast signal received by the broadcast receiver in an external storage medium, which is connected to the corresponding USB port, thereby playing the stored signal. Various external devices, such as a computer, a printer, a mobile phone, and so on, may be connected to the USB port of the broadcast receiver according to the present invention. However, since the present invention is more particularly related to the recording and playing of a broadcast signal (also referred to as a broadcast program), examples of having a storage medium connected to the USB port of the broadcast receiver via cable/wireless connection will be presented herein. The second embodiment of the present invention relates to providing a broadcast receiver provided with at least one Ethernet port, to storing a broadcast signal received by the broadcast receiver in an external storage medium, which is connected to the corresponding Ethernet port, thereby playing the stored signal.

The broadcast receiver receives a broadcast signal transmitted via any one of a terrestrial, satellite, and cable, and processes the received signal, thereby displaying the processed signal on a display screen. Also, when the broadcast receiver corresponds to an IPTV, the broadcast receiver receives a broadcast signal through an internet network and processes the received signal, thereby displaying the processed signal on a display screen. Any type of receiver that can receive a broadcast signal may be applied as the broadcast receiver according to the present invention. The storage medium may correspond to any one of an optical recording (or writing) medium, which uses light rays to record and/or read data, a magnetic recording (or writing) medium, which uses a magnetic element to record and/or read data, and a non-volatile memory, which uses semi-conductor chips to record and/or read data. Examples of the optical recording medium include a DVD R/W, CD R/W, and so on. Examples of the magnetic recording medium include a magnetic tape, HDD, and so on. And, examples of the non-volatile memory include a compact flash (CF) card, a smart card, a portable memory stick, a multi-media card, a secure digital (SD) card, a USB memory, and so on.

Furthermore, the storage medium according to the present invention is not limited only to a simple storage medium. Instead, just as a PMP, a PDA, a mobile phone, a smart phone, and so on, a display-type storage medium that can decode a broadcast signal, so as to provide users with audio and video content may also be taken into consideration. However, this does not limit the scope and spirit of the present invention. According to an embodiment of the present invention, an HDD corresponds to the storage medium that is externally connected to the broadcast receiver via cable/wireless connection. Finally, according to the present invention, the storage of the broadcast signal to the storage medium may be performed by any one of instant recording, scheduled recording, and time-shift. Herein, time-shift may also be referred to as a time machine. For example, when a digital video recorder (DVR) mode is activated (or enabled), and when a time-shift mode is turned on, the time-shift function is executed. Herein, the time-shift function may be executed automatically, or executed in accordance with the user's selection. The time-shift operation will be described in more detail later on.

First Embodiment (Using USB)

FIG. 1 illustrates a block diagram showing the structure of a recording/playing device including a broadcast receiver according to a first embodiment of the present invention.

More specifically, FIG. 1 illustrates an example for storing a broadcast signal in an external storage medium connected to the broadcast receiver through a universal serial bus (USB) port and reading the stored broadcast signal. According to the first embodiment of the present invention, a broadcast receiver is provided with at least one USB port. Herein, the broadcast receiver stores a broadcast signal to a storage medium, which is externally connected to the broadcast receiver through the respective USB port, thereby playing the stored broadcast signal.

Additionally, according to the first embodiment of the present invention, when an external storage medium is connected to the broadcast receiver via wireless/wired connection (i.e., via at least one of wireless connection and wired (or cable) connection) through the USB port of the broadcast receiver, a digital video recorder (DVR) mode of the broadcast receiver is activated (or enabled) so that the time-shift function can be performed. On the other hand, when the external storage medium is not connected to the broadcast receiver, or when the connection between the external storage medium and the broadcast receiver is blocked, the DVR mode is deactivated (or disabled), so that only the basic television (TV) function is performed. Thus, a broadcast receiver that is not equipped with a built-in storage medium may be able to perform DVR functions at a low fabrication cost.

Referring to FIG. 1, the recording/playing device consists of a broadcast receiver 100 and an external storage unit 150. The broadcast receiver 100 includes a tuner 101, a demodulating unit 102, a decoding unit 103, a display unit 104, a controller 105, a record/play controlling unit 106, an on-screen display (OSD) processor 107, and a USB interface unit 108. The USB interface unit 108 includes at least one USB port. The external storage unit 150 includes a storage medium, the storage medium being connected to the USB interface unit 108 via wireless/wired connection. In the example shown in FIG. 1, a storage medium 151 of the external storage unit 150 is connected to the USB port of the USB interface unit 108 via wired connection, and a storage medium 152 is connected to the USB port of the USB interface unit 108 via wireless connection. More specifically, in the external storage unit 150, the storage medium 151 may be linked to the USB port of the USB interface unit 108 in wired connection, and the storage medium 152 may be linked to the USB port of the USB interface unit 108 in wireless connection. Alternatively, the storage medium 151 may be in wired connection with the USB port of the USB interface unit 108, and, simultaneously, the storage medium 152 may be in wireless connection with the USB port of the USB interface unit 108.

The physical connection of the USB includes cable (or wired) USB connection and wireless USB connection.

The cable USB connection uses a USB cable in order to connect the storage medium 151 of the external storage unit 150 to the USB port of the USB interface unit 108 included in the broadcast receiver 100. According to an embodiment of the present invention, when one end of the USB cable is connected to the USB port of the USB interface 108 included in the broadcast receiver, and when the other end of the USB cable is connected to the storage medium 151 of the external storage unit 150, the DVR mode is activated. Herein, the DVR mode may either be automatically activated or be activated based upon the user's selection. When the DVR mode is activated, DVR-associated functions, such as a time-shift function, may be executed (or performed). If the DVR mode is inactive (or non-activated), DVR-associated functions will not be performed. For example, if the DVR mode is inactive, even when one or more DVR-associated execution menu items is/are selected, the corresponding functions will not be performed. Such functions will not be performed even when a DVR-associated command is inputted through an input device, such as a remote controller.

The wireless USB connection uses a USB dongle 153 in order to connect the storage medium 152 of the external storage unit 150 to the USB port of the USB interface unit 108 included in the broadcast receiver 100. The USB dongle 153 is a device that enables wireless functions to be performed in a product that does not have any wireless functions. In this embodiment of the present invention, an example of using a wireless local area network (LAN) USB dongle will be presented. In the broadcast receiver according to the embodiment of the present invention, the USB dongle 153 is connected to the USB interface unit 108 included in the broadcast receiver, and if the pair of the USB dongle 153 corresponds to the storage medium 152 of the external storage unit 150, the DVR mode will be activated. Also, in this embodiment of the present invention, the DVR mode may either be automatically activated or be activated based upon the user's selection.

At this point, the USB dongle 153, which is inserted in the USB port of the USB interface 108, and the storage medium 152 that is paired with the USE dongle 153 each includes a wireless transmitting/receiving unit for wirelessly transmitting and/or receiving the broadcast signal. Each of the wireless transmitting/receiving units respectively equipped to the USB dongle 153 and the storage medium 152 paired with the USB dongle 153 may use the Ethernet method to transmit or receive a broadcast signal. In this case, a wireless LAN USB dongle may be used as the USB dongle 153.

More specifically, in the broadcast receiver 100 shown in FIG. 1, the tuner 101 receives a broadcast signal of a specific frequency through at least one of terrestrial, satellite, cable, and internet network. The tuner 101 may be provided for each broadcast source, such as terrestrial broadcasting, cable broadcasting, satellite broadcasting, personal broadcasting, or may correspond to an integrated tuner. Also, when the tuner 101 is assumed to be a tuner for terrestrial broadcasting, the tuner 101 may be provided with at least one of a digital tuner and an analog tuner or may be provided with a digital/analog integrated tuner.

For example, a terrestrial broadcast signal that are transmitted through the antenna, the tuner 101 tunes the broadcast signal selected by the user and outputs the tuned broadcast signal to the demodulating unit 102. The demodulating unit 102 demodulates the inputted broadcast signal by inversing the modulation method.

The broadcast signal that is demodulated by the demodulating unit 102 is configured in a transport stream (TS) format and is outputted to the decoding unit 103.

The decoding unit 103 includes an audio decoder and a video decoder. The decoding unit 102 decodes the broadcast signal outputted from the demodulating unit 102 to the broadcast signal played through the record/play controlling unit 106 to the respective decoding algorithm, thereby outputting the decoded broadcast signal to the display unit 104. At this point, a demultiplexer (DEMUX) (not shown) may be further included between the demodulating unit 102 and the decoding unit 103. The demultiplexer may separate (or distinguish) the broadcast signal to an audio elementary stream (ES) and a video elementary stream (ES), thereby outputting each elementary stream to the respective decoder. Furthermore, when a plurality of programs are multiplexed to a single channel, the demultiplexer selects only the user-selected broadcast signal, so as to separate (or distinguish) the selected broadcast signal to an audio elementary stream (ES) and a video elementary stream (ES). If a data stream or a system information stream is included in the demodulated broadcast signal, this is also separated from the selected broadcast signal by the demodulating unit and transferred to the corresponding block. However, since this part does not correspond to the characteristics of the present invention, a detailed description of the same will be omitted for simplicity.

Meanwhile, when a storage medium of the external storage device 150 is connected to the broadcast receiver through the USB interface 108 of the broadcast receiver, and when the DVR mode is activated, and when settings are made for at least one of instant recording and time-shift mode, the record/play controlling unit 106 receives the demodulated signal from the demodulating unit 102.

The record/play controlling unit 106 may store the signal outputted from the demodulating unit 102 in the corresponding storage medium of the external storage device 150 through the USB interface unit 108. According to the embodiment of the present invention, in case of the instant recording function, the broadcast signal is stored in a semi-permanent storage region of the storage medium. Alternatively, in case the time-shift mode is turned on, the broadcast signal is stored in a time-shift storage region.

Based upon the user's play (or playback) request (or demand), the record/play controlling unit 106 reads the broadcast signal stored in the storage medium of the external storage device 150 and output the read signal to the decoding unit 103. The broadcast signal stored in the storage medium is configured in a transport stream format compression-encoded by a transmitting system. Therefore, the decoding unit 103 decodes the compression-encoded transport stream to the respective decoding algorithm, thereby outputting the decoded transport stream to the display unit 104. The record/play controlling unit 106 may encrypt the broadcast signal being outputted to the external storage device 150 and output the encrypted broadcast signal. In this case, the record/play controlling unit 106 should be able to decrypt the broadcast signal that is encrypted by the external storage device 150 and played-back. Herein, the encryption/decryption operations may be performed individually via any one of software, hardware, firmware and middleware, or via a random pair of software, hardware, firmware and middleware.

DVR Mode Activation

In the present invention, when a connection of the external storage device is detected through the USB interface 108, the DVR mode may be activated. At this point, the DVR mode may either be automatically activated or be activated based upon the user's selection.

According to an embodiment of the present invention, when a USB cable connected to a storage medium is connected to a USB port of the USB interface unit 108 included in the broadcast receiver 100, the record/play controlling unit 106 determines the connection as a cable USB connection, thereby activating the DVR mode. More specifically, when the connection is determined (or verified) as a cable USB connection, either the DVR mode is automatically activated, or a message for selecting activation status of the DVR mode is displayed onto a screen so that the user can select whether or not to activate the DVR mode.

According to another embodiment of the present invention, when a USB dongle 153 paired with a storage medium 152 is connected to a USB port of the USB interface unit 108 included in the broadcast receiver 100, the record/play controlling unit 106 determines the connection as a wireless USB connection, thereby activating the DVR mode. Similarly, when the connection is determined (or verified) as a wireless USB connection, either the DVR mode is automatically activated, or a message for selecting activation status of the DVR mode is displayed onto a screen so that the user can select whether or not to activate the DVR mode.

According to an embodiment of the present invention, the message for selecting activation status of the DVR mode is OSD-processed by the OSD processor 107, so as to be displayed through the display unit 104.

The activation of the DVR mode indicates that DVR-associated functions, such as a time-shift function, may be performed (or executed). Therefore, when the DVR mode is inactive the DVR-associated functions are not performed. For example, if the DVR mode is inactive, even when one or more DVR-associated execution menu items is/are selected, the corresponding functions will not be performed. Such functions will not he performed even when a DVR-associated command is inputted through an input device, such as a remote controller.

FIG. 2 to FIG. 8 respectively illustrate exemplary operations of DVR mode activation functions and time-shift functions, when USB connection is detected.

Figure 2:
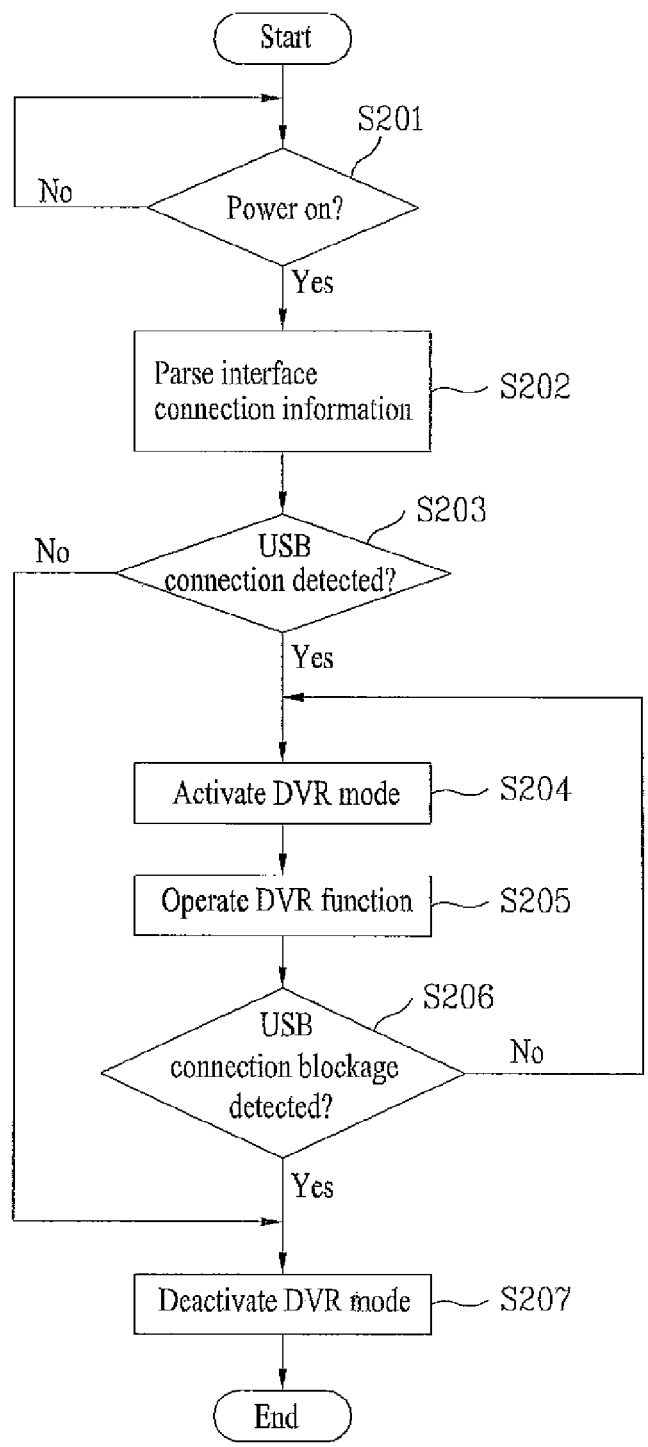
FIG. 2 illustrates a flow chart of an exemplary DVR mode operation, when the power of the broadcast receiver is turned on, according to an embodiment of the present invention.

FIG. 2 illustrates a flow chart of an exemplary DVR mode operation, when the power of the broadcast receiver is turned on, according to an embodiment of the present invention. More specifically, when the power of the broadcast receiver is turned on and the broadcast receiver is booted (S201), the record/play controlling unit 106 parses interface connection information (S202). Then, based upon the parsed result, when the USB connection is detected (S203), the DVR mode is activated (S204). More specifically, when the digital video recorder (DVR) mode is activated, this indicates that the broadcast signal that is currently being received is stored in the storage medium of the external storage device 150, and also that the functions required for playing the broadcast signal stored in the storage medium may be provided.

For example, when the DVR mode is activated, the DVR menu items on the main menu of the broadcast receiver become transparent or high-lighted, so that the user can recognize that the DVR mode has been activated. Conversely, when the DVR mode is inactive (or non-activated), the DVR menu items remain non-transparent or become non-visible from the menu screen, so as to indicate to the user that the DVR mode is inactive.

In step 204, when the DVR mode is activated, DVR-associated functions are operated (S205).

For example, when the status of the time-shift mode is set to "ON", the broadcast signal demodulated by the demodulating unit 102 is stored in the storage medium of the external storage device 150 through the record/play controlling unit 106 and the USB interface unit 108.

At this point, in order to prevent the broadcast signal stored in the storage medium from being illegally copied (or duplicated) or being reproduced (or played-back) by a non-certified playing device, the record/play controlling unit 106 encrypts the demodulated and inputted broadcast signal, thereby outputting the encrypted broadcast signal to the USB interface unit 108. Herein, the playing device may correspond to any device that can play-back a broadcast signal stored in the storage medium without being encrypted, such as another broadcast receiver, a personal computer (PC), and a mobile phone.

If the encrypted broadcast signal stored in the storage medium is to be played by a different playback device, the corresponding playing device should download a program that can decrypt the encrypted broadcast signal through a certification process, so as to be able to play-back the corresponding broadcast signal.

Herein, a disclosed technology may be used as the encryption/decryption method, and detailed description of the same will be omitted for simplicity. Herein, encryption/decryption may include the meaning of scrambling/descrambling.

Meanwhile, while the DVR mode is activated and the DVR functions are performed, when the USB connection is blocked, the record/play controlling unit 106 may automatically detect such blockage (S206). If the USB connection is verified in step 206, the process goes back to step 204 in order to maintain the activation of the DVR mode. However, if the USB connection blockage is detected, the DVR mode is deactivated (S207).

For example, in case of the cable USB connection, a removal of the USB cable connected to the USB port of the USB interface unit 108 may be determined as the USB connection blockage. Alternatively, in case of the wireless USB connection, a removal of the USB dongle 153 connected to the USE port of the USB interface unit 108 may be determined as the USB connection blockage. In step 207, when the DVR mode is inactive, the DVR menu items on the main menu also become inactive. Accordingly, the DVR-associated sub-menus are not displayed, or even when displayed, the corresponding functions are not performed (or executed). Furthermore, even when DVR-associated keys provided in the remote controller are inputted, the corresponding functions are not performed (or executed).

Figure 3:
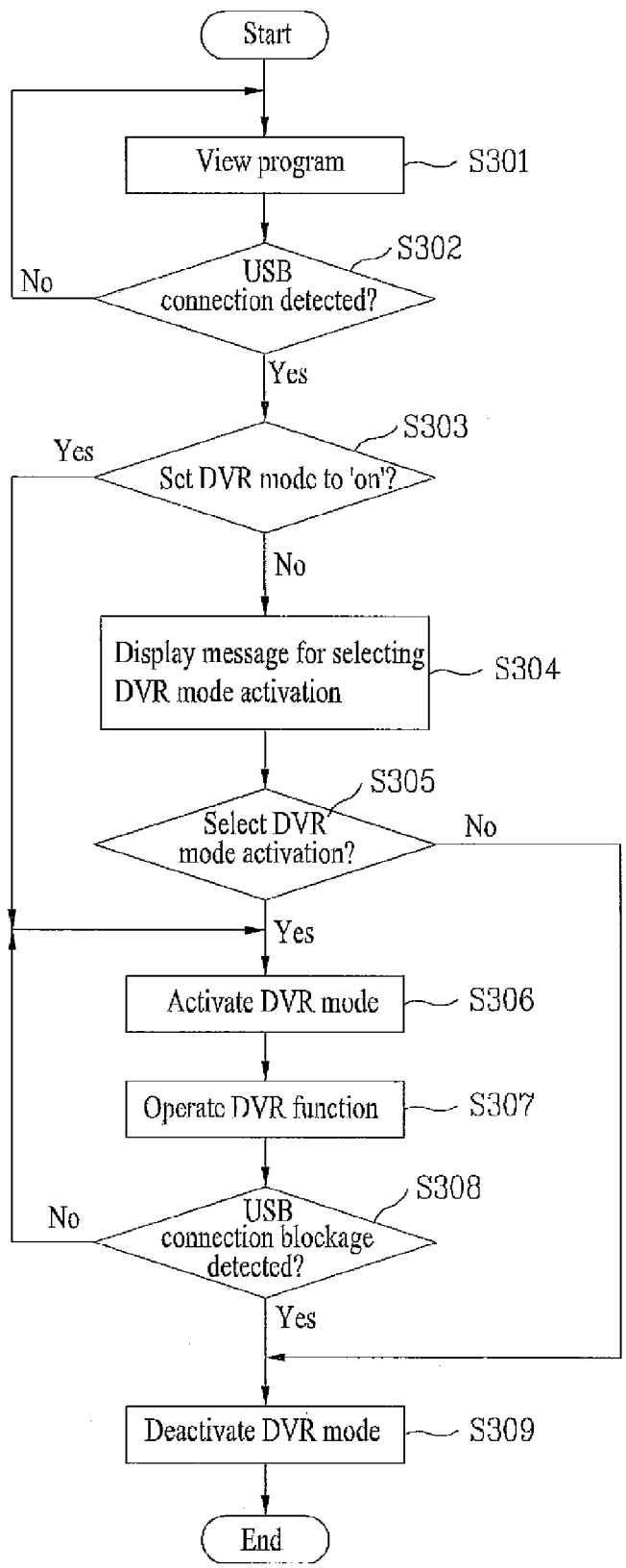
FIG. 3 illustrates a flow chart of an exemplary DVR mode operation, when the broadcast receiver receives and displays a broadcast signal, according to an embodiment of the present invention.

FIG. 3 illustrates a flow chart of an exemplary DVR mode operation, when the broadcast receiver receives and displays a broadcast signal, according to an embodiment of the present invention. More specifically, when the USB connection is absent, and when a user-selected broadcast signal is being displayed on the screen (S301), if the USB connection is verified (S302), the broadcast receiver can determine whether the DVR mode is set to "ON" (S303) In step 303, when it is determined that the DVR mode is set to "ON", the DVR mode is automatically turned on (S306), and the DVR-associated functions are executed (S307). For example, when the DVR mode is activated, the DVR menu items on the main menu of the broadcast receiver become transparent or high-lighted, so as to notify the user that the DVR mode is activated. Conversely, if the DVR mode is inactive, the DVR menu items become non-transparent or non-visible from the menu screen, so as to indicate to the user that the DVR mode is inactive.

Herein, the example shown in FIG. 2 may be applied as the exemplary operation of the DVR function. For example, when the status of the time-shift mode is set to "ON", the broadcast signal demodulated by the demodulating unit 102 is stored in the storage medium of the external storage device 150 through the record/play controlling unit 106 and the USB interface unit 108. At this point, in order to prevent the broadcast signal stored in the storage medium from being illegally copied (or duplicated) or being reproduced (or played) by a non-certified playing device, the record/play controlling unit 106 encrypts the demodulated and inputted broadcast signal, thereby outputting the encrypted broadcast signal to the USB interface unit 108. If the encrypted broadcast signal stored in the storage medium is to be played by a different playing device, the corresponding playing device should download a program that can decrypt the encrypted broadcast signal through a certification process, so as to be able to play-back the corresponding broadcast signal.

Figure 4:
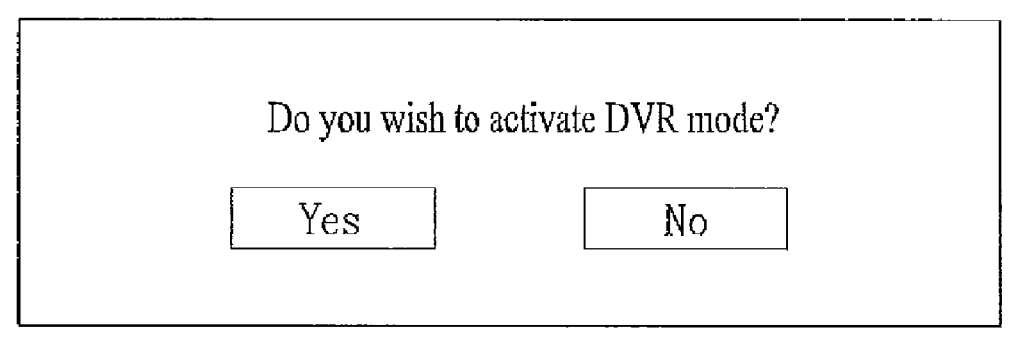

In step 303, when it is determined that the DVR mode is set to "OFF", a message for selecting activation status of the DVR mode is displayed in the form of an OSD (S304). FIG. 4 illustrates an exemplary message for selecting activation status of the DVR mode according to the present invention. More specifically, when a message saying "Do you wish to activate DVR mode?" is displayed, and when the user uses the remote controller to select 'Yes', it is determined that the DVR mode activation option has been selected (S305), and the process continues to step 306 so as to activate the DVR mode. If the user selects 'No', in FIG. 4, and if it is determined that the DVR mode deactivation option has been selected (S305), thereby proceeding to step 309 so as to maintain the inactive status of the DVR mode.

The on/off status of the DVR mode may be preset, or he selected when the USB connection is verified.

Meanwhile, based upon the results of step 306 and step 307, while the DVR mode is activated and the DVR function is being performed, when it is verified that the USB connection has been blocked (S308), the process continues to step 309 so as to deactivate the DVR mode. Similarly, in case of the cable USB connection, a removal of the USB cable connected to the USB port of the USB interface unit 108 may be determined as the USB connection blockage. Alternatively, in case of the wireless USB connection, a removal of the USB dongle 153 connected to the USB port of the USB interface unit 108 may be determined as the USB connection blockage.

Figure 5:
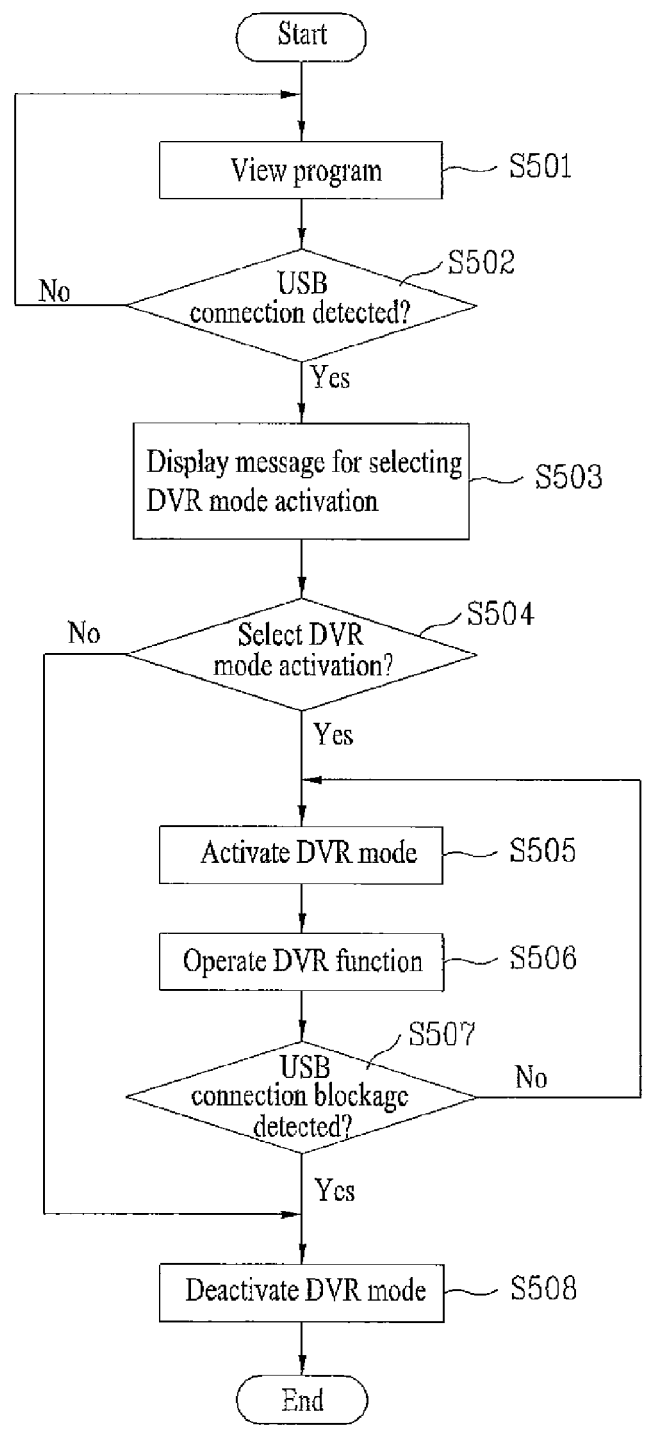
FIG. 5 illustrates a flow chart of an exemplary DVR mode operation, when the broadcast receiver receives and displays a broadcast signal, according to another embodiment of the present invention.

FIG. 5 illustrates a flow chart of an exemplary DVR mode operation, when the broadcast receiver receives and displays a broadcast signal, according to another embodiment of the present invention. The difference between FIG. 3 and FIG. 5 is that, when a USB connection is detected while viewing a broadcast program, a verification message, shown in FIG. 4, enabling the user to select the activation status of the DVR mode is displayed regardless of the DVR mode on/off status.

More specifically, in FIG. 3, when the DVR mode is turned on, the DVR mode is automatically activated. And, the verification message of FIG. 4 is displayed only when the DVR mode is turned off, so as to enable the user to select the activation status of the DVR mode. Since the remaining process steps of FIG. 5 are similar to those shown in FIG. 3, a detailed description of the same will be omitted for simplicity.

FIG. 6A to FIG. 6E respectively illustrate exemplary DVR functions shown in FIG. 2, FIG. 3, and FIG. 5 that can be performed when the DVR mode is activated.

Figure 6A:
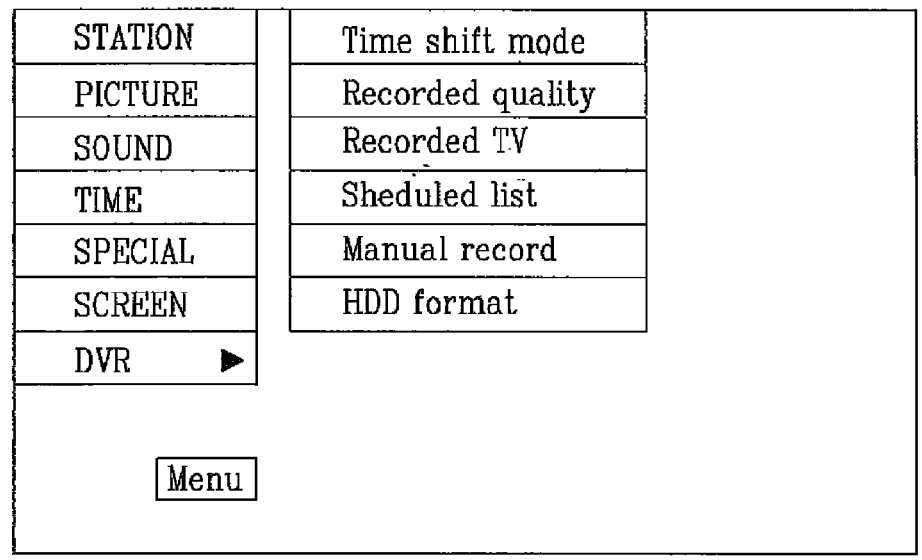
FIG. 6A to FIG. 6E respectively illustrate exemplary DVR functions shown in FIG. 2, FIG. 3, and FIG. 5 that can be performed when the DVR mode is activated (or enabled)

More specifically, FIG. 6A shows an exemplary main menu screen when the DVR mode is activated. In other words, when the DVR mode is activated, the DVR menu items of the main menu become transparent, thereby displaying DVR-associated sub-menus, as shown in FIG. 6A, which can be operated when the DVR mode is activated.

FIG. 6A shows an example of displaying a time-shift mode sub-menu, a recorded quality sub-menu, a recorded TV sub-menu, a scheduled list sub-menu, a manual recording sub-menu, and an HDD format sub-menu.

Figure 6B:
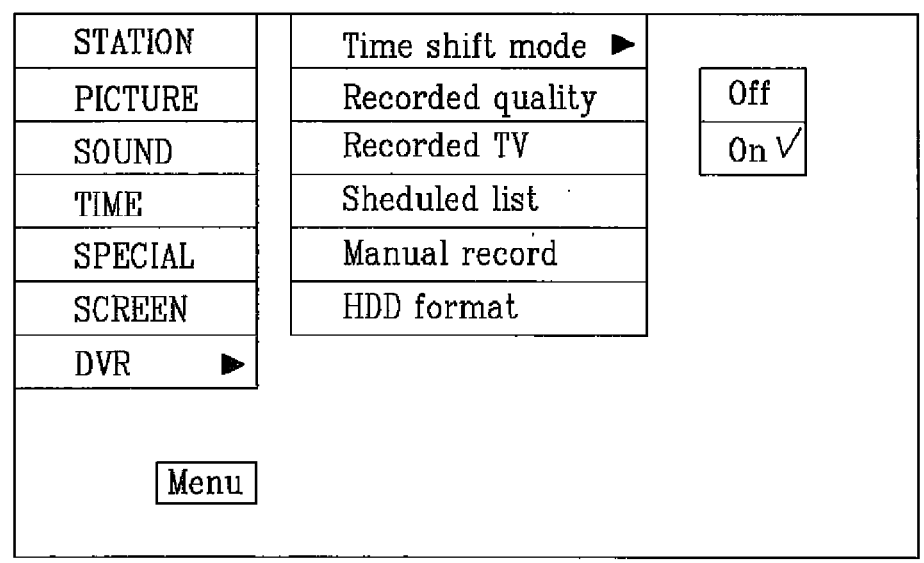

At this point, the user may use the time-shift mode sub-menu to set the on/off status of the time-shift mode, as shown in FIG. 6B. When the 'ON' option is selected in the time-shift mode sub-menu, the time-shift mode is set to 'ON'. Alternatively, when the 'OFF' option is selected in the time-shift mode sub-menu, the time-shift mode is set to 'OFF'. Accordingly, when the DVR mode is activated, and when the time-shift mode is turned on, the demodulated broadcast signal that is received in real-time is automatically, stored in the time-shift storage region within the storage medium of the external storage device 150 through the record/play controlling unit 106 and the interface unit 108.

However, when the DVR mode is activated, and when the time-shift mode is turned off, either the time-shift function is not performed, or the user is given a choice to select whether or not execute the time-shift function. For example, a message for selecting an execution status of the time-shift function is OSD-processed by the OS processor 107, so as to be displayed through the display unit 104. According to an embodiment of the present invention, a default value is set for the "ON" status of the time-shift mode. This indicates that, once the USB connection is verified, the broadcast signal is automatically stored in the external storage device.

Figure 6C:
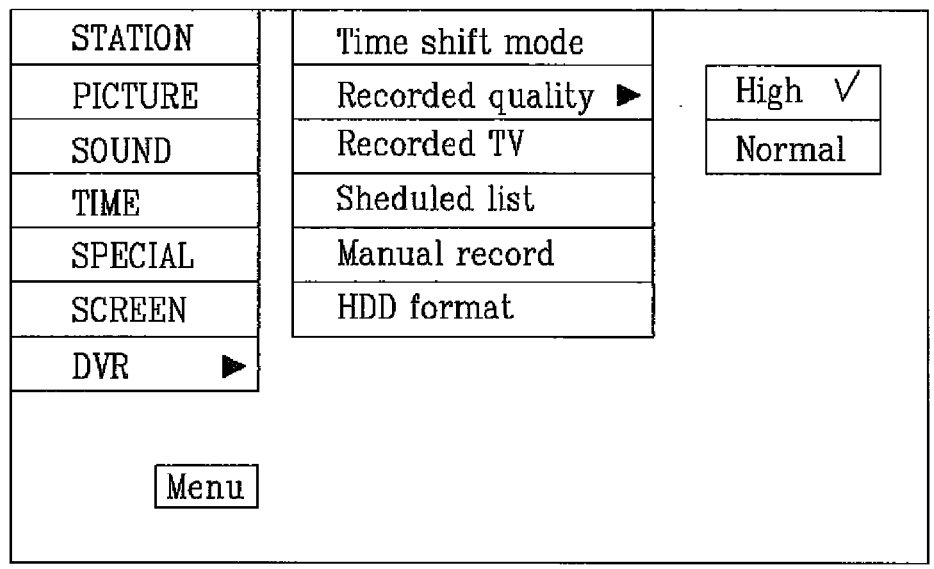

The user may input setting for scheduled recording quality by using the recorded quality sub-menu, as shown in FIG. 6C. For example, when the user wishes to schedule-record an analog broadcast program or an external input signal to the storage medium of the external storage device 150, the user may select the quality of the schedule-recording.

Furthermore, by using the recorded TV sub-menu, the user may verify a list of recordings for broadcast signals recorded in the storage medium of the external storage device 150. By using the scheduled list sub-menu, the user may verify a list of recordings for schedule-recorded content. And, by using the manual recording sub-menu, the user may input settings for detailed options when performing scheduled recording. For example, the user may input settings for the broadcast program that is to be schedule-recorded, the channel, the date, the starting time, and the ending time.

Figure 6D:
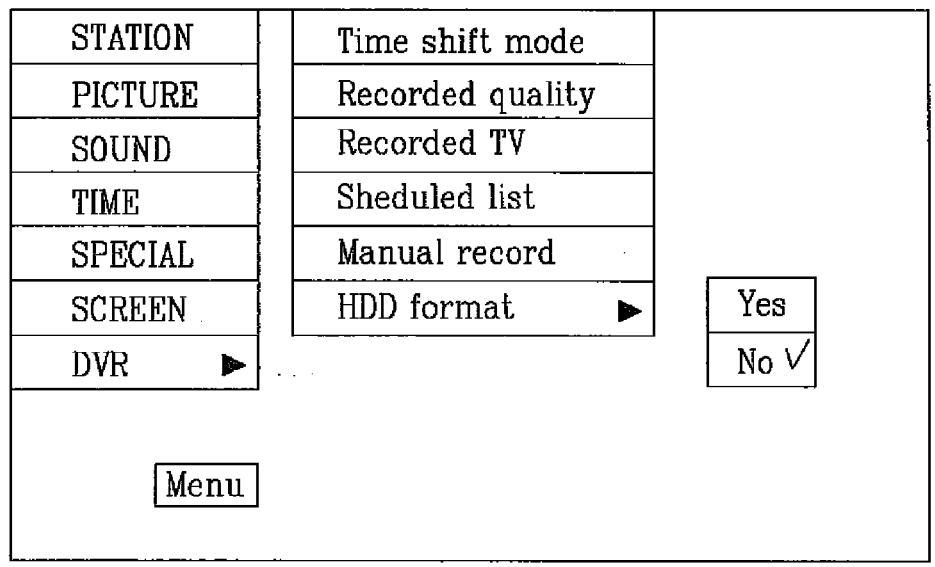
Figure 6E:
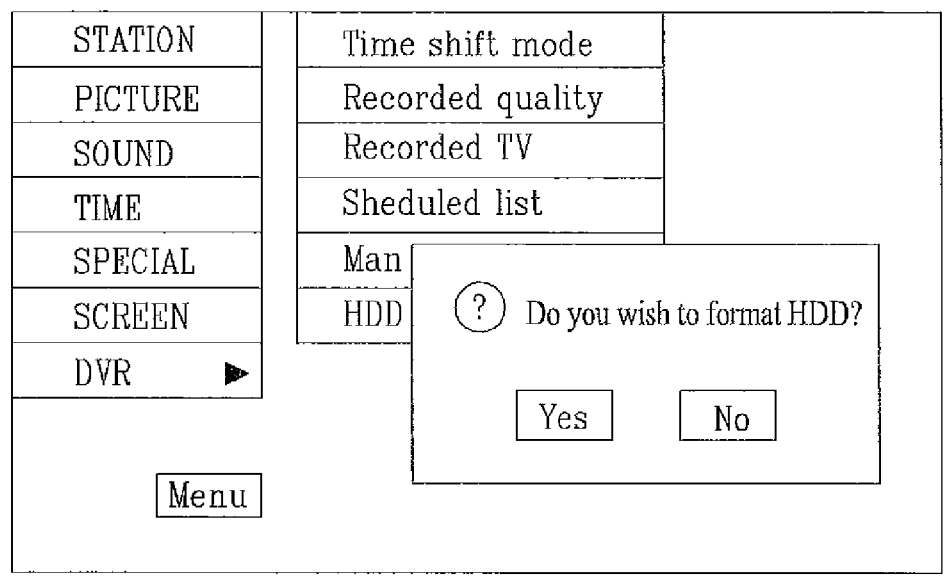

Finally, by using the HDD format sub-menu, the user may format the recording medium, such as the HDD, of the external storage device 150. For example, even when the 'Yes' option is selected from the HDD format sub-menu, as shown in FIG. 6D, whether or not to perform formatting of the recording medium is verified once again by using a message inquiring whether or not to proceed with the formatting, as shown in FIG. 6E. At this point, if the user selects the 'Yes' option, the storage means (e.g., HDD) connected to the USB port is formatted. And, if the user selects the 'No' option, the HDD is not formatted.

The DVR-associated function may be performed through the menu items displayed on the screen, as shown in FIG. 6A to FIG. 6E, and may also be performed by using DVR-associated function keys provided on an input device (e.g., a remote controller). For example, when the DVR mode is activated, and when a record key is inputted by pressing the corresponding key on the remote controller, the broadcast signal that is received and demodulated is stored in a semi-permanent storage region of the storage medium of the external storage device 150 through the record/play controlling unit 106 and the interface unit 108. Furthermore, the number of items included in the sub-menu being displayed when the DVR mode is activated, and the position, order, and operation of the same are merely exemplary. In other words, such number, position, order, and operation of sub-menu items may be easily altered or modified by the system designer. Therefore, the present invention will not be limited to the examples given in the above-described embodiment of the present invention.

Second Embodiment (Using Ethernet)

Apart from the USB interface according to the first embodiment of the present invention, a variety of interfaces may be applied between the broadcast receiver and the storage medium of the external storage device according to the present invention. Examples of the other interfaces include an Ethernet module, a Bluetooth module, a close-range wireless internet module, a portable internet module, a home PNA module, an IEEE1394 module, a PLC module, a home RF module, and an IrDA module.

However, the present invention will not be limited only to the examples given herein. According to the second embodiment of the present invention, an Ethernet interface is used as the interface between the broadcast receiver and the storage medium of the external storage device.

Furthermore, it can be assumed that the broadcast receiver and the storage medium of the external storage device configure a home network. And, in this case, two different situations may be taken into consideration.

The first situation corresponds to the broadcast receiver operating as the server of the home network. In this case, the broadcast signal receives the broadcast receiver and transmits the received broadcast signal to a different electric device (which corresponds to an external storage device in the description of the present invention) through the home network, and the different electric device stores the received broadcast signal. By doing so, the different electric device may be able to provide the broadcast signal received from the broadcast receiver to the user. Therefore, it is evident that the different electric device should at least be provided with an audio/video decoder.

The second situation corresponds to a different electric device (which corresponds to an external storage device in the description of the present invention) operating as the server of the home network. In this case, the broadcast receiver, a third electric device, or a third broadcast signal provider may be applied as the transmission path for transmitting the broadcast signal to the different electric device. As described above, the broadcast signal transmitted to the different electric device is transmitted to the broadcast receiver through the home network. Then, the broadcast receiver may be able to provide the transmitted broadcast signal to the user. Alternatively, the broadcast signal transmitted to the different electric device is transmitted to the broadcast receiver through cable/wireless Ethernet, and the broadcast receiver may be able to provide the transmitted broadcast signal to the user. At this point, the broadcast receiver may use the different electric device as the recording medium, thereby being able to execute the DVR function.

Figure 7:
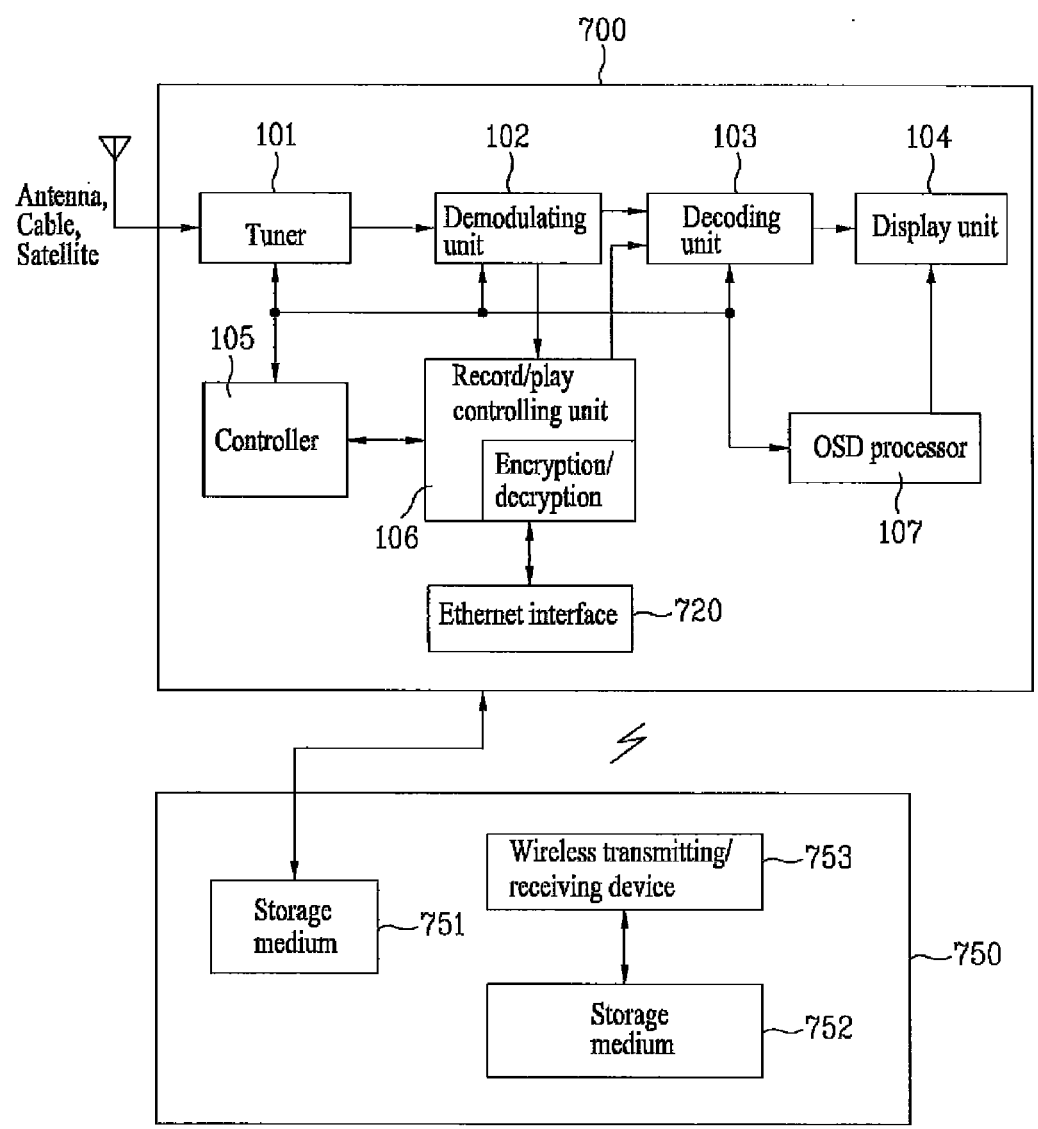
FIG. 7 illustrates a block diagram showing the structure of a recording/playing device including a broadcast receiver according to a second embodiment of the present invention.

FIG. 7 illustrates a block diagram showing the structure of a recording/playing device including a broadcast receiver according to a second embodiment of the present invention. More specifically, FIG. 7 shows an example of transmitting/storing a broadcast signal using an Ethernet method to/in the storage medium connected outside of the broadcast receiver via cable/wireless connection, thereby reading the stored broadcast signal in a future usage.

In the second embodiment of the present invention, at least one of a cable (or wired) local area network (LAN) card and a wireless LAN card is provided in the broadcast receiver. Then, a broadcast signal is stored in an external storage medium connected through cable or wirelessly to the LAN card, so as to play-back the stored broadcast signal. The present invention may also be provided with an integrated cable/wireless LAN card, and such LAN card may be provided either inside or outside of the broadcast receiver. At this point, a cable/wireless Ethernet protocol is adopted as the transmitting/receiving method of the broadcast signal according to the embodiment of the present invention.

More specifically, according to the second embodiment of the present invention, when an external storage device provided with a storage medium is connected to the LAN card of the broadcast receiver via cable or wireless connection, the DVR mode of the broadcast receiver is activated, thereby being capable of performing the time-shift function. Furthermore, when the external storage device is not connected, or when the connection of the external storage device is blocked, the DVR mode is deactivated, so that only the basic television (TV) functions can be executed. Accordingly, a broadcast receiver that is not provided with a built-in storage medium may be able to execute a DVR function at a low cost.

The operations of includes a tuner 101, a demodulating unit 102, a decoding unit 103, a display unit 104, a controller 105, and a record/play controlling unit 106 of the broadcast receiver 700 shown in FIG. 7 are identical to those of the broadcast receiver 100 shown in FIG. 1. Therefore, detailed description of the same will be omitted for simplicity.

According to the second embodiment of the present invention, an Ethernet interface unit 720 within the broadcast receiver 700 is equipped with a LAN card, which communicates using an Ethernet method. Herein, the LAN card may correspond to at least one of a cable (or wired) LAN card, a wireless LAN card, and a cable/wireless integrated LAN card.

More specifically, when an external storage device is connected to the Ethernet interface unit 720 by any one of a cable connection and a wireless connection, and when any one of an instant recording function and a time-shift function is selected, the broadcast signal demodulated by the demodulated 102 is outputted to the Ethernet interface unit 720 through the record/play controlling unit 106. When settings are made for a scheduled recording, and when the preset scheduled recording time is reached, the corresponding broadcast signal demodulated by the demodulating unit 102 is outputted to the Ethernet interface unit 720 through the record/play controlling unit 106. At this point, it is assumed that the DVR mode is activated. Herein, the DVR mode may either be automatically activated or be activated based upon the user's selection.

If an external storage medium 751 is connected by cable (i.e., Ethernet cable), the Ethernet interface unit 720 outputs the broadcast signal outputted from the record/play controlling unit 106 to the storage medium 751 of the external storage device 750 using a cable Ethernet method and stores the outputted broadcast signal in the storage medium 751.

Alternatively, if an external storage medium 752 is wirelessly connected, the Ethernet interface unit 720 outputs the broadcast signal outputted from the record/play controlling unit 106 to the storage medium 752 of the external storage device 750 using a wireless Ethernet method and stores the outputted broadcast signal in the corresponding storage medium 752. In order to do so, the Ethernet interface unit 720 includes a wireless transmitting/receiving unit.

At this point, a wireless transmitting/receiving unit 753 including a wireless LAN card for transmitting or receiving a broadcast signal in an Ethernet method is included in the storage medium 752 of the external storage device 750, which is paired with the wireless LAN card of the broadcast receiver 700. The wireless transmitting/receiving unit 753 may be connected to a storage medium 752, such as HDD and flash memory. The wireless transmitting/receiving unit 753 of the external storage device 750 may include an Ethernet MAC frame parser (not shown), which, when an Ethernet MAC frame is received, parses only the broadcast signal within the data region of the received Ethernet MAC frame and stores the parsed broadcast signal in the storage medium 752.

In order to do so, the Ethernet interface unit 720 may include an Ethernet MAC frame generator (not shown), which converts a broadcast signal that is to be stored in the storage medium of the external storage device 750 to an Ethernet MAC frame, as shown in FIG. 8.

Referring to FIG. 8, the Ethernet MAC frame includes a (7+1)-byte preamble/start of frame byte (SFD) region, a 6-byte destination address region, a 6-byte source address region, a 2-byte data field length region, a 45-byte to 1,500-byte data region, and a 4-byte checksum region. Herein, the 7-byte preamble region is used for matching the synchronization between the source and the destination. Also, the 1-byte SDF region indicates the starting point of the Ethernet MAC frame. The 2-byte data field length region indicates the length of a next data region. The 4-byte checksum region is configured of a 32-bit hash code, which is used for error-checking in the Ethernet MAC Frame.

According to an embodiment of the present invention, when a broadcast signal demodulated by the demodulating unit 102 of the broadcast receiver 700 is transmitted to the storage medium 752 of the external storage device 750 through the Ethernet network, an address of a wireless LAN card of the broadcast receiver 700 is included in the source address region within the Ethernet MAC frame, an address of a wireless LAN card of the external storage device 750 is included in the destination address region, and a broadcast signal that is to be transmitted is included in the data region. According to the embodiment of the present invention, when the Ethernet MAC frame, as shown in FIG. 8, is received by the wireless transmitting/receiving unit 753 of the external storage device 750, the Ethernet MAC frame parser (not shown) of the wireless transmitting/receiving unit 753 parses only the broadcast signal within the data region. Thus, the parsed broadcast signal is stored in the storage medium 752.

Two different assumptions can be made of the parsed broadcast signal.

In the first assumption, the following may be taken into consideration. The broadcast receiver 700, which receives the broadcast signal from a broadcasting station, does not perform a demultiplexing process. Also, the transport stream is directly inserted in the data region within the Ethernet MAC frame through the Ethernet MAC frame generator. Thereafter, the inserted transport stream is transmitted to the external storage device 750. In this case, if the external storage device 750 corresponds to a display-type storage medium, such as PMP, a demultiplexer, an audio decoder, and a video decoder within the external storage device 750 are used to provide audio and video to the user. Meanwhile, when the external storage device 750 corresponds to a simple storage medium, such as a portable HDD, the broadcast signal is directly stored in the storage medium, the external storage device 750 is connected to a device provided with a demultiplexer, and an audio/video decoder, such as a second broadcast receiver. Then, after uploading the broadcast signal, audio and video may be provided to the user.

In the second assumption, the following may be taken into consideration. The broadcast receiver 700, which receives the broadcast signal from a broadcasting station, performs a demultiplexing process, so as to create an audio elementary stream (ES) with audio packets only and to create a video elementary stream (ES) with video packets only. Thereafter, each elementary stream is inserted in the data region within the Ethernet MAC frame, thereby being transmitted to the external storage device 750. In this case, the storage medium may correspond to a display-type storage medium or a simple storage medium. It is apparent that in the above description, with the exception of the demultiplexing process, the first case is identical to the second case. However, this does not indicate that the property right of this invention is abandoned (or relinquished).

The DVR-associated functions described in the first embodiment, such as DVR mode activation/deactivation and time-shift function, may be directly applied in the second embodiment of the present invention. For example, when a connection of the external storage device 750 to the Ethernet interface unit 720 is detected, the record/play controlling unit 106 activates the DVR mode. Subsequently, either the broadcast signal is stored in the storage medium of the external storage device 750 via cable or wirelessly through the Ethernet interface unit 720, or the broadcast signal is read from the storage medium of the external storage device 750, thereby being outputted to the decoding unit 103. Furthermore, when the DVR mode is activated, and when the time-shift mode is turned on, the record/play controlling unit 106 encrypts the broadcast signal that is demodulated and inputted. Thereafter, the encrypted broadcast signal may be stored in the time-shift storage region within the storage medium of the external storage device 750 through the Ethernet interface unit 720. Finally, when a blockage of the connection of the external storage device 750 is detected, the record/play controlling unit 106 deactivates the DVR mode.

Also, in the second embodiment of the present invention, in order to prevent the broadcast signal stored in the storage medium from being illegally copied (or duplicated) or being reproduced (or played-back) by a non-certified playing device, the record/play controlling unit 106 encrypts the broadcast signal that is to be recorded, thereby outputting the encrypted broadcast signal to the Ethernet interface unit 720. Herein, the playing device may correspond to any device that can play-back a broadcast signal stored in the storage medium without being encrypted, such as another broadcast receiver, a personal computer (PC), and a mobile phone.

In this case, when the broadcast signal that is encrypted and stored in the storage medium of the external storage device 750, the record/play controlling unit 106 should be able to decrypt the broadcast signal that is being played-back. Herein, the encryption/decryption operations may be performed individually via any one of software, hardware, firmware and middleware, or via a random pair of software, hardware, firmware and middleware. If the encrypted broadcast signal stored in the storage medium is to be played-back by a different playing device, the corresponding playing device should download a program that can decrypt the encrypted broadcast signal through a certification process, so as to be able to play-back the corresponding broadcast signal. Herein, a disclosed technology may be used as the encryption/decryption method, and detailed description of the same will be omitted for simplicity. Herein, encryption/decryption may include the meaning of scrambling/descrambling.

Recording Using EPG

Hereinafter, an EPG according to an embodiment of the present invention will be described, and an embodiment of recording a broadcast signal in a storage medium 151, 152, 751, and 752 of the external storage device 150 and 750 using the EPG will also be described in detail. FIG. 9 illustrates an EPG output format according to an embodiment of the present invention.

Referring to FIG. 9, the EPG is configured in a two-dimensional structure including a horizontal axis and a vertical axis. Herein, one axis includes channel information, and the other axis includes time information. More specifically, multiple electronic program information is received, which are stored in the memory. Then, a list of information indicating a time-based schedule of a program with respect to the multiple channels is created, thereby outputted to the display unit.

At this point, the length of the cell wherein the program title is position may be configured to be in direct proportion to the program time.

More specifically, the program start time information and the program end time information are collected, then controlled so that the collected time information are matched to the respective time on the time axis. According to the above-described embodiment of the present invention, the length of each cell wherein the program title is positioned may vary depending upon the corresponding broadcast program.

An input-type display cell indicates whether the currently selected input signal corresponds to any one of a TV broadcast signal, an audio broadcast signal, a data broadcast signal, and software update.

A channel list cell indicates at least one of a channel name, a channel number, and a channel logo, thereby indicating the information on a channel carrying the program title. One of more channels may be configured herein. According to an embodiment of the present invention, seven different channels may be simultaneously displayed on a single display window (or screen) as OSD. Furthermore, when the number of channels being received exceeds '7', the present invention may be embodiment so that the next channel information is displayed by using a scroll.

A date cell indicates the date when the corresponding program is received. At this point, the EPG may be configured of a plurality of dates. For example, program information for eight days may be outputted.

A program title cell indicates the title of a program being received during a predetermined time period with respect to a specific channel. For example, a title information of the corresponding program may be displayed (or indicated) in the program title cell.

A time list proposes a reference time information for indicating the time at which the corresponding program is received. For example, the time list may be configured in units of seconds, minutes, and hours. Furthermore, the EPG indicated on a single screen (as a single OSD) may output program information for a predetermined period of time.

A current time cell indicates the current time, which is indicated as the current data and time information.

An input-type select menu enables the user to select various input types, such as a TV broadcast signal, an audio broadcast signal, a data broadcast signal, and software update. At this point, the TV broadcast signal may either be distinguished as a satellite broadcast signal, a cable broadcast signal, and a terrestrial broadcast signal, respectively, which are marked in order to be identified, or the TV broadcast signal may simply be marked as 'TV' regardless of the broadcast format. More specifically, when the user selects a TV broadcast signal as the input type, the EPG outputs information of the program being received as the TV broadcast signal. Alternatively, when the user selects a data broadcast signal as the input type, the EPG outputs information of the program being received as the data broadcast signal.

A mode select menu at the bottom of the screen enables the user to select an item that can modify the plurality of embodiment modes based upon the EPG output format. More specifically, any one of the many embodiment modes, such as a grid type, an 8-days type, a now-and-next type, and a single type. For example, when the EPG is outputted as a grid type, and the user selects a mode shift from the grid type to the single type EPG on the mode select menu, the EPG is then outputted as a single type.

Furthermore, a visual indicator (or icon) is set to be displayed simultaneously as the program title within the EPG output window or within a cell wherein the program title is positioned. Thus, the setting of predetermined functions may be visually notified (or indicated).

The visual indicator indicating the predetermined functions, or the characteristics and nature of the corresponding program may be configured in any form, as long as the visual indicator is created in a form different from other indicators (or icons), so that the user can easily identify the visual indicator. More specifically, even if the visual indicators share the same shape or form, each indicator may be used as a different function set-up indicator (or icon), as long as each indicator can be identified by its own color. Herein, the visual indicators may also be formed to have different shapes.

At this point, examples of indicators with displayable preset functions may include a scheduled viewing indicator, a scheduled recording indicator, and recording-on indicator. An input-type indicator visually indicating the input type may also be created and used. And, a channel logo visually identifying the corresponding channel from the channel list may also be created and used.

Figure 10A:
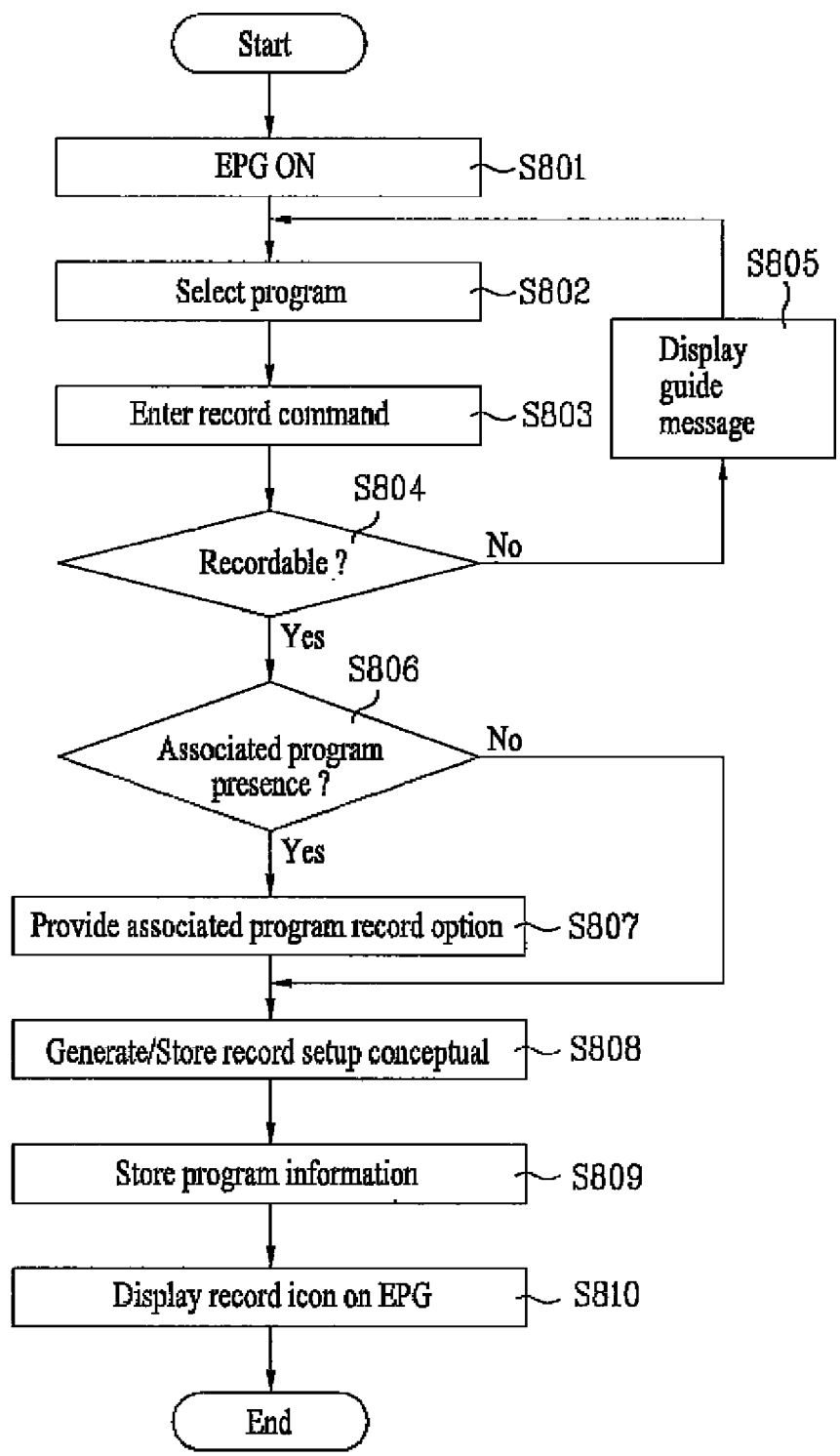
FIG. 10A illustrates a flow chart showing a method for setting the storage of a broadcast signal using a program guide according to the present invention.

FIG. 10A illustrates a flow chart showing a method for setting the storage of a broadcast signal using a program guide according to the present invention. A method for setting the storage of a broadcast signal may include the steps of outputting a program guide with respect to the broadcast signal, inputting a program select signal that is to be recorded from the outputted program guide, and setting a recording status for the selected program. When a program guide output for a broadcast signal is requested, the requested program guide is outputted onto a screen.

Also, in the step of inputting a program select signal that is to be recorded from the outputted program guide, a predetermined program title is selected by the user from the program guide. At this point, the select signal may be inputted by various methods. For example, a cursor moves to a program title cell on the program guide, then when the corresponding cell is highlighted, program title cell may be considered to be selected. Also, when a function select key for the program title is inputted, the program title may be considered to be selected. Furthermore, by highlighting the program title cell from a touch-screen, the select signal may be considered to be inputted.

In the step of setting a recording status for the selected program, information specifying the selected program is used, so as to program settings for recording. At this point, the information specifying the program corresponds to the channel information and time information of the program that is being received. The time information may include start time information and end time information, or start time information and duration information. Hereinafter, the method of programming settings for recording according to an embodiment of the present invention will be described in detail with reference to FIG. 10A.

When a program guide is outputted (S801), the user selects the title of a program he or she wishes to record from the program guide (S802). Then, the user inputs a recording command for the selected program (S803).

At this point, selecting a program that is currently being received corresponds to instant recording, and selecting a program that is to be received after the current time corresponds to scheduled recording.

For example, when the user selects a program title, the present invention may be embodied so that a recording command is automatically inputted. Alternatively, the present invention may be embodied so that a recording command is inputted when a recording command key is pressed from the remote controller. When the recording command is inputted, the present invention determines whether the program can be recorded or not (S804).

Based upon the result of step 804, if the program can be recorded, the process continues to the next step. And, if the program cannot be recorded, a guidance message is outputted (S805).

For example, the present invention determines whether or not a pre-programmed recorded program exists. In other words, the present invention determines whether double recording settings exist. In case, double recording settings exist, a message notifying that the recording process cannot be processed is outputted.

Additionally, the present invention determines the storage capacity of the storage medium 151, 152, 751, and 752 included in the external storage device, thereby outputting a message notifying that the recording process cannot be processed, if the remaining storage capacity is insufficient for recording. At this point, the storage capacity is determined while taking into consideration the quality of the received broadcast signal and the duration of the broadcast signal Herein, if the recording can be processed by down-grading the picture quality level from an HD-level to an SD-level, such information is notified to the user by outputting a corresponding guidance message. In this case, a signal for regulating the picture quality may be outputted to a user interface.

When it is verified, in step 804, that the program is recordable, the system determines whether a program associated with the selected program exists (S806).

Herein, the program associated with the selected program refers to a series program corresponding to the same type of special production. In case the same program is separately received, the program associated with the selected program would correspond to a multi-program. The program associated with the selected program may also correspond to a recommended program, which is recommended to be viewed along with the selected program. Apart from the above-described example, the associated program may also include all other programs that are associated with the selected program.

Based on the result of determining whether an associated program exists, if it is determined that an associated program exists, an option for recording the associated program is provided to the user (S807) More specifically, the option for recording the associated program may output a user interface (UI) that can enable the user to select the recording of the program that is determined to be associated with the selected program. Settings for recording the associated program may be programmed by using the outputted user interface (UI).

When it is determined that an associated program does not exist, or when the recording option for the associated program has been selected, information specifying the program, which is selected to be recorded, is generated, and the generated information is stored (S808). Herein, the information specifying the selected program corresponds to the channel information and time information of the program that is being received. The time information may include start time information and end time information, or start time information and duration information.

Apart from the information specifying the selected program, information on the selected program, such as title information, genre information, viewing rating level information, synopsis information, and so on may be collectively stored (S809).

Figure 10B:
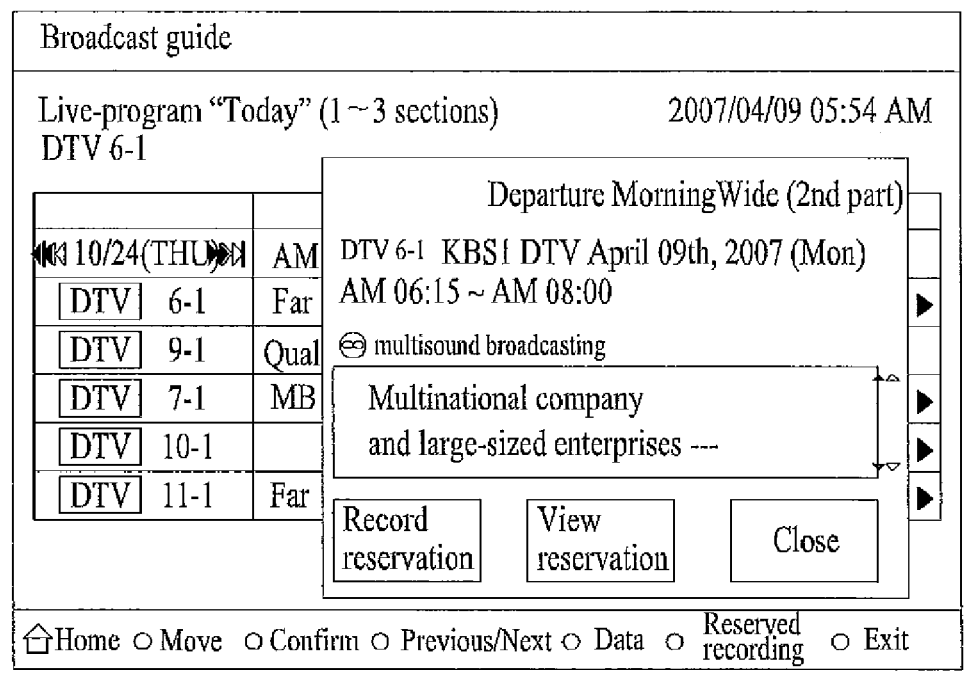
FIG. 10B illustrates an exemplary screen for setting a record mode on the program guide according to the present invention.

When the recording setting is completed, a record setting status option is displayed on the program guide (S810). At this point, the record setting status option may be indicated by a visual indicator. FIG. 10B illustrates an exemplary screen for setting a record mode on the program guide according to the present invention. The broadcast signal of a program that is selected through the above-described record setting may be immediately downloaded or downloaded at the scheduled time, so as to be stored in the storage medium of the external storage device.

Management of the Storage Medium

Figure 11:
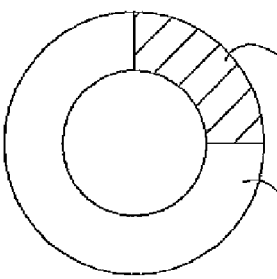
FIG. 11 illustrates an available storage capacity level in an external storage medium according to the present invention.

FIG. 11 illustrates an available storage capacity level in an external storage medium according to the present invention. For example, the storage medium may either correspond to the storage medium of the external storage device 150 that is connected to the USB interface 108 via cable or wireless connection, as shown in FIG. 1, or correspond to the storage medium of the external storage device 750 that is connected to the Ethernet interface 720 via cable or wireless connection, as shown in FIG. 7.

Referring to FIG. 11, the broadcast receiver 100 and 700 may check the capacity of the storage medium, wherein the broadcast signal is stored, so as to notify the user of the storage capacity. In this case, it can be assumed that the user has requested for the display of the available storage capacity through the user interface (UI) and that the requested information is being displayed accordingly. However, the present invention will not be limited only to the above-described example.

In a method for indicating the available storage capacity of the storage medium 151, 152, 751, and 752 according to a first embodiment of the present invention, the used capacity and the available capacity (i.e., remaining capacity) are separately marked and indicated within a geometrical shape, in comparison to the total storage capacity. This can be visually illustrated. Herein, the geometrical shape can be two-dimensional or three-dimensional.

In a method for indicating the available storage capacity of the storage medium 151, 152, 751, and 752 according to a second embodiment of the present invention, the total storage capacity, the used capacity, and the available capacity (i.e., remaining capacity) may be indicated in capacity units. At this point, the total storage capacity, the used capacity, and the available capacity may be selectively marked (or indicated). More specifically, each capacity may be indicated in combination in order to notify the user of the available storage capacity.

In a method for indicating the available storage capacity of the storage medium according to a third embodiment of the present invention, the total storage capacity and the available capacity may be indicated in time units. At this point, the time of the total storage capacity may be selectively indicated. Also, the recordable time may vary depending upon the recording quality (i.e., picture quality). For example, a 75-hours-length is recordable in an HD-level, whereas a 100-hours-length is recordable in an SD-level. By outputting such information, the user may appropriately select the recording quality (or picture quality), thereby being able to efficiently use the storage capacity.

In a method for indicating the available storage capacity of the storage medium according to a fourth embodiment of the present invention, the total storage capacity, the used capacity, and the available capacity (i.e., remaining capacity) may be indicated in percentage units. At this point, a list of the capacity percentage may be combined and selectively indicated (or displayed) so that the user can be informed of the available storage capacity.

FIG. 12 illustrates a record list of recorded content stored in the external storage medium according to the present invention. Referring to FIG. 12, a list of stored recordings (or recorded program) may be outputted to a single user interface (UI). Herein, it may also be assumed that the list of stored recordings is displayed based upon a user request through the user interface.

The record list may indicate a storage capacity (or space) of the storage medium, wherein the recorded program is stored. For example, when a storage medium (e.g., HDD) is embedded, or when an external storage medium is connected through an external interface (e.g., when an external HDD is connected either though the USB interface shown in FIG. 1 or through the Ethernet interface 720 of FIG. 7), the record list indicates in which storage space the recorded program is stored.

The record list compares the overall storage capacity of the storage space with the total storage capacity of the recorded program shown in the record list, thereby outputting the remaining storage capacity. The record list includes information on at least one program. Herein, when the record list of the overall recorded programs that stored cannot be outputted (or printed) on a single page, the record list may be printed on separate pieces of paper. At this point, the shifting of pages may be performed by using a conversion (or shift) key or a scroll bar. The record list also includes a recorded program cell, which indicates the information on at least one program. The information included in each recorded program cell will now be described in detail.

The recorded program cell includes information identifying the recorded program. The information identifying the recorded program may correspond to program title information, or record time information, image information, and so on. However, the present invention will not be limited only to the given example. And so, the information identifying the recorded program may include all information capable of identifying programs that are to be stored.

More specifically, the recorded program cell may include an image information region. The image information displayed in the image information region may correspond to received information or information generated while storing the recorded program. The image information may correspond to a still image of the program that is to be stored or a still image configured in the form of a moving picture or a slideshow. Herein, the image information may also correspond to a thumbnail image, which displays a specific frame of the recorded video in a size smaller than the original size.

The recorded program cell may also include record time information. The record time information indicates the point where the recording starts. The recording point may be indicated by at least one of data and time.

The recorded program cell may also include recorded data size (or capacity) information. At this point, the recorded data size may be marked by capacity units or by the recorded time length.

The recorded program cell may include detailed program information. The detailed program information may be stored at the same time as when the received program information is recorded. Then, the detailed program information and the received program information may be outputted from the recorded program cell at the same time. At this point, the detailed program information may either he set to be outputted to a region identical to that of the recorded program cell, or be set to be outputted to another region. For example, when a recorded program cell is highlighted, the detailed program information may be outputted at the same time through a pop-up window, or the output of the record list may be turned off, so as to output a detailed program information window in a separate region.

Furthermore, the recorded program cell may include play (or playback) status information of the stored program. For example, a recorded program that has never been played may be marked as "new", a recorded program that has been fully played in the past may be marked as "completed", and a recorded program that has only been partially played may be marked as "partial". The record list may also include a menu function key that can enable the user to input commands, such as play command, edit command, and so on, with respect to the corresponding recorded program. The menu function may include a play (or playback) function, such as initial play and previous play, an edit function, such as a "select all" function, a partial select function, and other functions, such as a "move to" function, a copy function, and output of detailed program information.

FIG. 13 illustrates an exemplary method for selecting a program that is to be played from the record list according to the present invention. Referring to FIG. 13, a program may be selected from the record list, so as to select an option associated with playing (or playback). The option associated with playing may be simultaneously outputted to the record list and through a pop-up window, or may be outputted in a separate region. The output of the record list has already been described in detail with reference to FIG. 12.

A play-associated option window may include information, such as a program title and recording time. At least one program that is to be played (or program subject to playback) may be selected. More specifically, a single program may be selected to be played, or a plurality of programs may be selected to be played. The option window being outputted may be varied or changed based upon the number of programs that are to be played.

When a single program is selected to be played, an option function associated with playing the corresponding program may be executed. For example, option functions associated with playing (or playback) includes initial play, previous play, scheduled play, fast play, repeated play, bookmark play, jump play, summarized play, select all, "move file to", delete, copy to external storage medium, edit information, and so on. Herein, the option function may be positioned in a respective option window.

The initial play function either indicates an initial (or very first) play of a selected program (i.e., recorded program), or indicates a function of playing from the first portion of the corresponding recorded program, once a previous play has been completed. The previous play function represents the function of continuing the play of a recorded program starting from a temporary ending point, when the program was being played in the past and then ended (or paused or interrupted) in the middle. The scheduled play function sets the time after the current time as the play start time. Then, once the scheduled play time is reached, the scheduled play function allows the selected recorded program to be played automatically.

The "select all" function indicates selecting all recorded programs stored in at least one of an internal storage medium and an external storage medium as the playback subject. When multiple storage spaces are provided, the "move file to" function moves the storage space in which the selected recorded program is to be stored. At this point, the recorded programs may be moved from the external storage medium to the internal storage medium, or from the internal storage medium to the external storage medium. Alternatively, the recoded programs may also be moved from the same physical storage device to another logical storage device.

When multiple programs are selected to be played, an option function associated with playing between multiple programs may be executed. For example, the menu items of the option function associated with playing between multiple programs may include continued play, scheduled play, cancel selection, "move selected file to", delete selected file, copy file to an external storage medium. At this point, the menu items of the option function may be positioned in an option window. The continued play function plays a plurality of selected programs in series. When selected, a plurality of programs may be played by a single play command. Also with respect to a plurality of programs, the scheduled play function may set-up a time after the current time as the playing (or playback) time. Then, when the playing time is reached, the plurality of selected programs is played automatically. The cancel selection function cancels the selection of a plurality of programs. The "move selected file to" function collectively moves the plurality of selected programs at the same time from the corresponding storage medium to another storage medium. The "delete selected file" function collectively deletes the plurality of selected programs. With respect to the option functions, the function that cannot be currently executed is disabled, and the function that can be currently executed is enabled.

Playing of the Recorded Program

Figure 14:
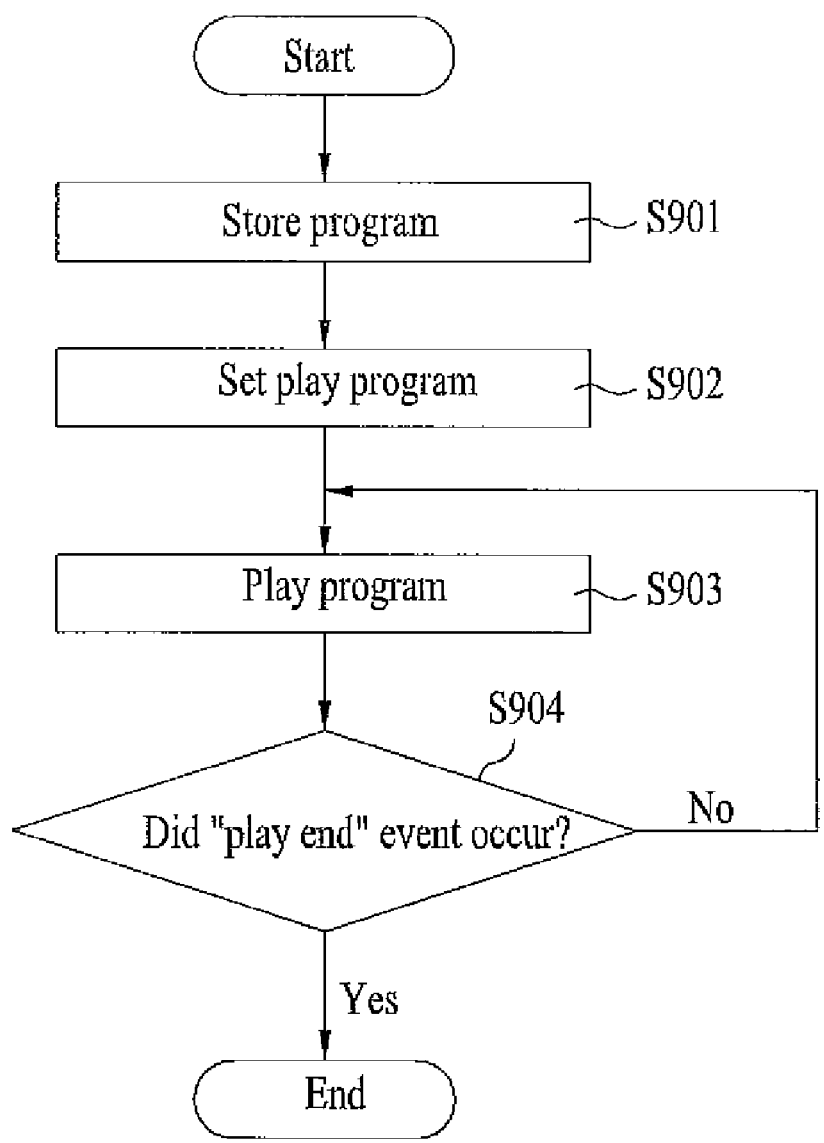
FIG. 14 illustrates a flow chart showing an exemplary method for playing a broadcast signal stored in the storage medium according to the present invention.

Hereinafter, a method for playing a broadcast signal stored in a storage medium 151, 152, 751, and 752 of an external storage device 150 and 750 will now be described in detail. FIG. 14 illustrates a flow chart showing an exemplary method for playing a broadcast signal stored in the storage medium 151, 152, 751, and 752 according to the present invention. Referring to FIG. 14, the method includes storing a received program in a storage medium of an external storage device through the USB interface 108 (shown in FIG. 1) or through the Ethernet interface 720 (shown in FIG. 7), selecting a play function of the stored program, and playing the selected program. The step of storing a program (S901) has already been described in detail. Therefore, the description of the same will be omitted for simplicity. In other words, the recorded program is stored in a predetermined region within the storage medium 151, 152, 751, and 752.

In the step of setting-up the play of the stored program (S902), among the at least one program stored in the storage medium, a program that is to be played is selected, and the selected program is set as the program subject for playing. An example of the method for selecting the stored program includes selecting a program from the record list. Examples of a method for setting a time for the program that is to be played includes a scheduled playing method for playing the selected recorded program at a set time after the current time, and an instant playing method for playing the selected recorded program at the current time.

In the step of playing a program having a set play start time (S903), when a schedule play is set-up, the selected recorded program is played at the scheduled time. And, when an instant play is set-up, the selected recorded program is played immediately after setting-up the play function. An example of playing the stored program includes uploading the corresponding recorded program within the storage medium 151, 152, 751, and 752 to a buffer (not shown) of the broadcast receiver 100 and 700, thereby playing the uploaded program. After the playing of the selected program, when it is determined that the playback of the corresponding program is completed or that an "end" command is inputted (S904), the play of the corresponding program is ended.

FIG. 15A to FIG. 15C respectively illustrate a method for storing a program and playing the stored program according to the present invention. Referring to FIG. 15A, an audio packet (A), a video packet (V), and a data packet (D) is combined in the demodulated broadcast signal, so as to become a stream. Each packet is given a number based upon the respective input order. When the stream shown in FIG. 15A is processed so that packets that are unnecessary for storing can be removed, the processed stream is then stored in the storage medium 151, 152, 751, and 752, as shown in FIG. 15B. At this point, a time stamp based upon the input order is also stored in the storage medium 151, 152, 751, and 752. For example, when the data packet of the stream (shown in FIG. 15A) is not stored, the data packet is removed. Then, a time stamp based upon the input order is assigned to the remaining audio packet and video packet, so that the time stamps may be stored in the storage medium 151, 152, 751, and 752 along with the respective packets.

When the broadcast signal and time stamps are stored in the storage medium 151, 152, 751, and 752, and when the broadcast signal is played, the time stamps that are assigned, as shown in FIG. 15C, are used, so as to assign a null packet in the place where the data packet has been removed in FIG. 15B, thereby creating a stream. This is because, since the demultiplexer recognizes a packet based upon its order of input, the stream stored as shown in FIG. 15B (i.e., stream configured of AVVVAAV) may be recognized as a stream configured of an AVVVAD packet. The stream configured as shown in FIG. 15C is uploaded to the broadcast receiver 100 and 700 from the storage medium 151, 152, 751, and 752, thereby being played by the broadcast receiver 100 and 700.

Executing Time-Shift Function

Hereinafter, a method of storing the broadcast signal being received by the broadcast receiver 100 and 700 in the storage medium of the external storage device 150 and 750 and, at the same time, playing the broadcast signal stored in the storage medium with a time difference will now be described in detail. The related embodiments will also be described herein. The above-described method for recording the broadcast signal (also referred to as a program) and method for playing the stored broadcast signal and the corresponding embodiments may also be applied in time-shift recording and playing. In the description of time-shift recording and playing, the description of identical parts or steps will be omitted for simplicity.

Figure 16:
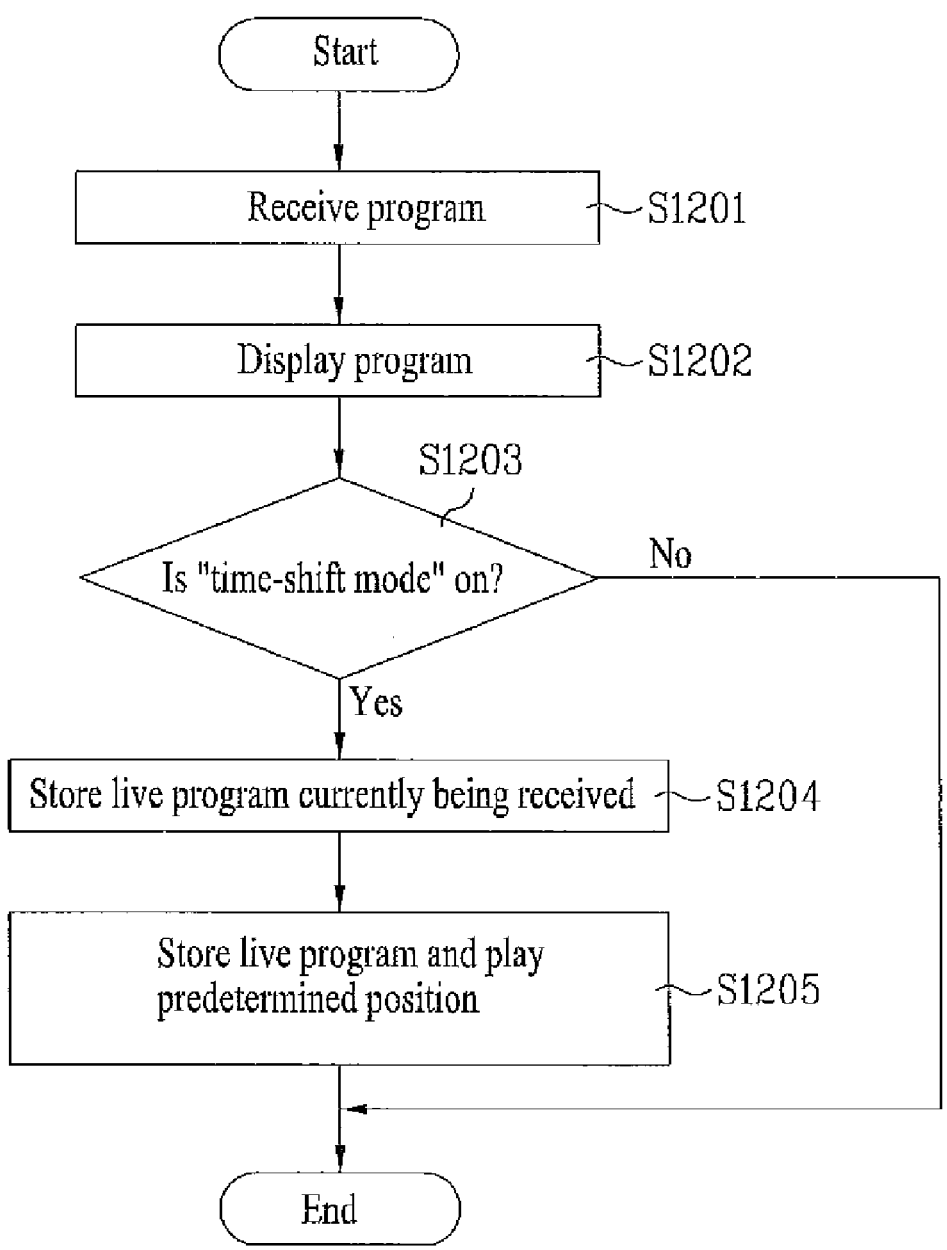
FIG. 16 illustrates a flow chart showing a method for storing a broadcast signal and performing time-difference play according to an embodiment of the present invention.

FIG. 16 illustrates a flow chart showing a method for storing a broadcast signal and performing time-difference play according to an embodiment of the present invention. Referring to FIG. 16, the method includes receiving a broadcast signal (S1201), outputting the received broadcast signal on a screen through a display unit 104 (S1202), determining whether or not a time-shift mode is turned on (S1203), and, when the time-shift mode is turned on, the broadcast signal that is currently being received (hereinafter referred to as a "live program" for simplicity) is stored in the storage medium of the external storage device (S1204). The method may further include, uploading the stored broadcast signal once again from the storage medium starting from a predetermined position with a time difference, while storing (or recording) the broadcast signal in the storage medium of the external storage device, thereby playing the uploaded broadcast signal (S1205).

In the step of determining whether or not the time-shift mode is turned on (S1203), when it is determined that the time-shift mode is not turned on, a message enabling the user to select whether or not to execute the time-shift function may be OSD-processed by the OSD processor 107 and displayed to the screen through the display unit 104. At this point, when the user selects the time-shift function, the method moves on to step 1204, thereby storing the received broadcast signal (i.e., live program) to the storage medium of the external storage device.

More specifically, the time-shift mode on status may be set-up when the power of the broadcast receiver 100 and 700 is turned on, automatically set-up when a channel is selected, and may also be set-up by a user input while receiving and outputting a program. Furthermore, the time-shift mode on status may be automatically set-up by a signal interruption. For example, in a receiver that can receiver both broadcast signals and telephone signals, when an incoming call is received while displaying a received broadcast signal, the time-shift mode may be automatically turned on. More specifically, the time-shift mode may be turned on due to an initial signal reception, a signal conversion, or an interruption signal. The time-shift mode may also be turned on when the user inputs a control signal. Therefore, the set-up for the time-shift mode will not be limited to before or after a program is received and outputted. More specifically, the time-shift mode may be immediately turned on when a power signal of the receiver is inputted and may also be turned on while outputting the corresponding program.

Also, when storing the live program received in step 1204 in the storage medium 151, 152, 751, and 752 of an external storage device, the corresponding live program may be stored while outputting the live program to the screen. Furthermore, while storing the live program, a predetermined position of the stored program may be played with a time difference, as described in step 1205. For example, a program that is currently being received in stored for the time-shift function. Then, at the same time, a specific position of a program, which has already been received and stored before the program that is currently being received, may be played with a time difference with the live program. At this point, the live program and the time-shifted program may be outputted at the same time. Furthermore, another program other than the currently time-shifted program may be outputted with the time-shifted program at the same time. For example, each program may be outputted simultaneously through a main screen and a sub-screen in a picture-in-picture (PIP) format, respectively. Alternatively, each program may be independently outputted at the same time in a double screen format.

Figure 17:
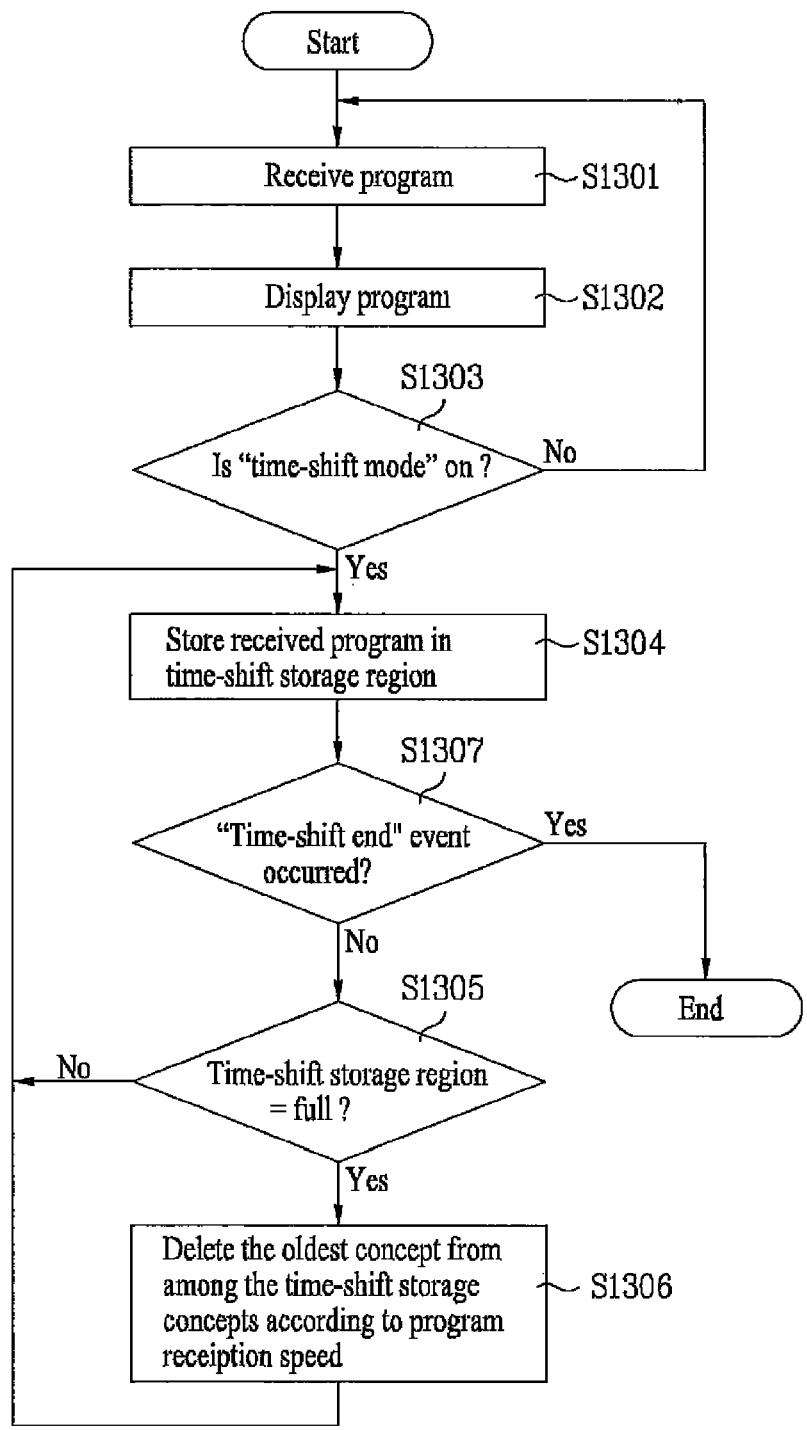
FIG. 17 illustrates a flow chart showing the process steps of performing a time-shift function.

FIG. 17 illustrates a flow chart showing the process steps of performing a time-shift function. Referring to FIG. 17, the method includes receiving a broadcast signal (S1301), displaying the received broadcast signal on a screen through a display unit 104 (S1302), and determining whether or not a time-shift mode is turned on (S1303). When it is determined in step 1303 that the time-shift mode is turned on, the broadcast signal being received (i.e., live program) is stored in the time-shift storage region of the storage medium.

More specifically, the time-shift mode on status may be set-up when the power of the broadcast receiver 100 and 700 is turned on, automatically set-up when a channel is selected, and may also be set-up by a user input while receiving and outputting a program. Furthermore, the time-shift mode on status may be automatically set-up by a signal interruption. For example, in a receiver that can receiver both broadcast signals and telephone signals, when an incoming call is received while displaying a received broadcast signal, the time-shift mode may be automatically turned on. More specifically, the time-shift mode may be turned on due to an initial signal reception, a signal conversion, or an interruption signal. The time-shift mode may also be turned on when the user inputs a control signal.

When it is determined in step 1303 that the time-shift mode is not turned on, only the program being received may be displayed, or a message enabling the user to select whether or not to execute the time-shift function may be OSD-processed by the OSD processor 107 and displayed to the screen through the display unit 104. At this point, when the user selects the time-shift function, the method moves on to step 1304, thereby storing the received broadcast signal (i.e., live program) to the storage medium of the external storage device.

While performing step 1304, it is determined whether a "time-shift end" event has occurred (S1307). Herein, the "time-shift end" event may correspond to a "time-shift end" signal or a power off signal of the receiver. Also, any command control signal ending the time-shift mode may correspond to the "time-shift end" event. When it is determined in step 1307 that a "time-shift end" event has occurred, the time-shift function is ended. Alternatively, if the "time-shift end" event has not occurred, the system determines whether the time-shift storage region is full (S1305).

When it is determined in step 1305 that the time-shift storage region is full, some of the previously stored data are deleted from the time-shift storage region (S1306). At this point, the step of deleting some of the previously stored data are deleted from the time-shift storage region (S1306) may be performed based upon a rate of receiving the broadcast signal. Herein, the storage (or recording) of the broadcast signal that is being received and the deletion of the previously stored data may be performed simultaneously.

The time-shift storage region of the storage medium included in the external storage device may be configured separately from a region where recorded data and general data (hereinafter, the storage region that is differentiated from the time-shift storage region will be referred to as a "semi-permanent storage region") At this point, the time-shift storage region may also be referred to as a temporary storage region for storing a predetermined amount of broadcast signal (or program). For example, when it is assumed that the time-shift storage region holds the capacity of storing a broadcast signal corresponding to a 2-hour-length, and when a 2-hour broadcast signal is stored in the time-shift storage region, the time-shift storage region becomes full. At this point, when a very first broadcast signal stored in the time-shift storage region is deleted, the broadcast signal that is currently being received may be continuously stored in the time-shift storage region.

More specifically, when the time-shift storage region is full, the oldest (or most outdated) broadcast signal is deleted from the time-shift storage region. Herein, the oldest broadcast signal may refer to the very first broadcast signal to be stored in the time-shift storage region. For example, the broadcast signal stored in the very first register of the time-shift storage region is deleted. And, the broadcast signal that is currently being received may be stored in the very last register of the time-shift storage region. When deleting the initially stored broadcast signal, the primarily stored broadcast signal may be deleted at the same rate as the rate of receiving the current broadcast signal. When the very first broadcast signal is deleted from the time-shift storage region in accordance with the current signal reception rate, the currently received broadcast signal may be stored in the time-shift storage region without influencing the storage capacity of the time-shift storage region. Accordingly, in this case, a maximum number of broadcast signals may be stored in the time-shift storage region.

Figure 18:
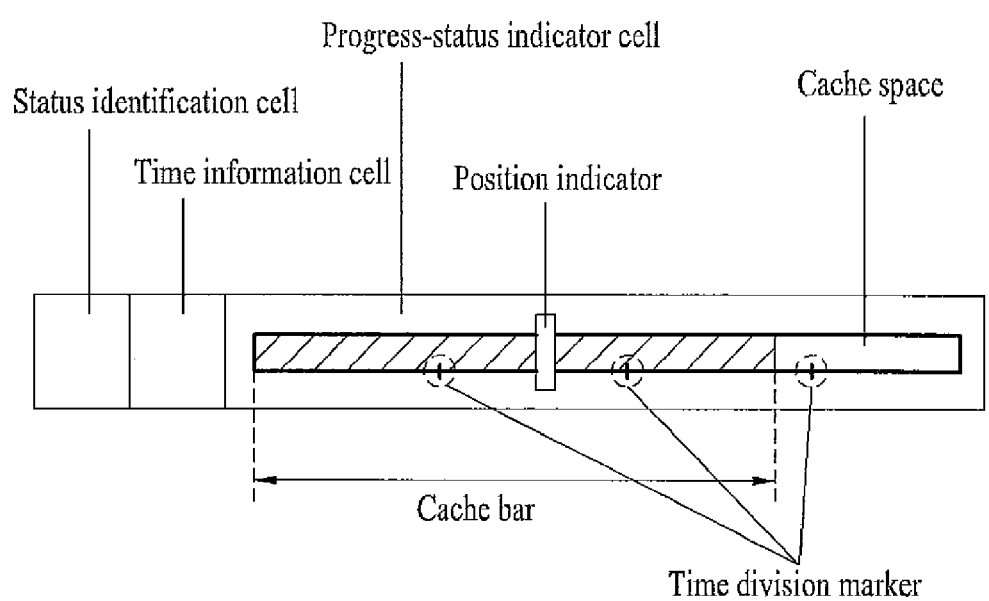
FIG. 18 illustrates an exemplary progress guidance on-screen display (OSD) according to the present invention.

FIG. 18 illustrates an exemplary progress guidance on-screen display (OSD) according to the present invention. Referring to FIG. 18, an OSD notifying the process of a function that is currently being executed may be outputted. Examples of the process notification (or guidance) OSD may include at least one of a status identification cell, a time information cell, a process status display cell. Herein, the status identification cell corresponds to a cell including information for identifying the status of a function currently being executed. Herein, the process status may be indicated in the form of a visual indicator, color, mode text information, and so on.

Figure 19A:
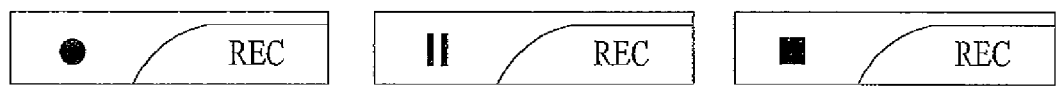
Figure 19B:
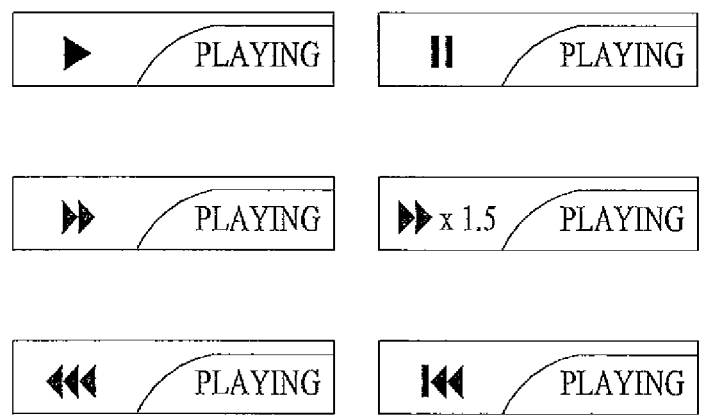

FIG. 19A to FIG. 19C respectively illustrate exemplary visual indicators and mode text information according to the present invention. For example, currently recording, recording paused, and recording stopped may be indicated as shown in FIG. 19A. Also, currently playing, playing paused, rewind play, forward play, and fast play may be indicated as shown in FIG. 19B. Finally, time-shift play (or delayed status), and output live program during time-shift recording (or storage) may be indicated as shown in FIG. 19C.

The time information cell corresponds to a cell including time information of a current process status, which may include at least one set of time information. For example, when a program is currently being recorded, the process time for recording may be indicated. Alternatively, when a program is currently being played, the time information cell may include the playing time information of the entire recorded program and the current playing time information of the corresponding program. When outputting a time-shifted program while executing the time-shift function, the recording time of a specific point where a predetermined position of the program is recoded and the recording time of the live program that is currently being received may be indicated. For example, when the current time is 8:30, and when a predetermined position of a program recorded 30 minutes earlier is time-shift played, the time information may be indicated as 08:00/08:30.

Alternatively, when the total time-shift recording time of a current live program is 1 hour and 30 minutes, and when a predetermined position of a program recorded 30 minutes earlier is time-shift played (i.e., the position of the program starting from after 1 hour of recording), the time information may be indicated as 1 hr/1 hr 30 min. Furthermore, a time difference between a time-shift play and a program that is currently being received and stored may also be indicated. For example, when a program recorded 1 hour earlier is time-shift played, and when it is assumed that the program that is currently being received is continuously being stored, the time information may be indicated as −1:00:00.

The process status display cell may include a cache space including a position indicator, which indicates the current position in the program.

The cache space refers to a progress bar including a cache bar. The cache space indicates the total storage capacity of the storage medium 151, 152, 751, and 752 of the external storage device. And, the cache bar shows the size of the program stored in the storage medium 151, 152, 751, and 752 of the current external storage device with respect to the total storage capacity. Herein, the storage capacity may be indicated in data size units or in time units. The cache bar visually indicates the current storage capacity status. At this point, the cache bar increases in direct proportion to the storage status. For example, when it is assumed that a memory capacity that can be time-shifted corresponds to 2 hours and that the current time-shifted time is 1 hour, the cache space indicates 2 hours and the cache bar is positioned at a 1-hour point of the cache space, which corresponds to a half (½) point of the cache space. At this point, when the time-shift recording is continued, the cache bar increases in direct proportion.

The position indicator is in direct proportion to the total recording (or storage) time and corresponds to an indicator visually showing process status, such as current play status. For example, when it is assumed that a memory capacity that can be time-shifted corresponds to 2 hours, that the current time-shifted time is 1 hour, and that a program stored 30 minutes earlier is to be outputted, the cache space indicates 2 hours, the cache bar is positioned at a 1-hour point of the cache space, which corresponds to a half (½) point of the cache space, and the position indicator is moved to a 30-minute point. At this point, the cache bar continues to increase in direct proportion to time-shift recording (or storing). And, as the time-shift play is executed starting from the 30-minute point marked by the position indicator, the position indicator continues to move in proportion to the playing (or playback) rate.

Any means that can visually indicate the current status position may be used as the position indicator, and example of the position indicator may include arrows, lines, or shapes. By moving the position indicator, the current recording or playing status may be changed. At this point, the position indicator may be directly moved, or may be moved by using a control key. In the method of directly moving the position indicator, a touch screen, a mouse pointer, a remote controller, and direction keys of the receiver may be used. However, this is merely exemplary, and any method for inputting a signal may be used. Furthermore, by using a control key, a position controller shift (or movement) control signal is generated, thereby enabling the position controller to be shifted (or moved).

The cache space may include a time-division marker, which divides the cache space by a predetermined time interval. By using the time-division marker, a relative current status may be visually known. For example, when the cache space has the capacity of 2 hours, and when the time is marked at each 30 minute interval, the user may be able to move the position indicator more easily, and the relative time may be recognized more easily.

FIG. 20 illustrates other exemplary on-screen displays that can be displayed on a display screen according to the present invention. For example, a sound status display, play (or playback) status display, such as repetition settings, and output language display may be indicated.

Figure 21:
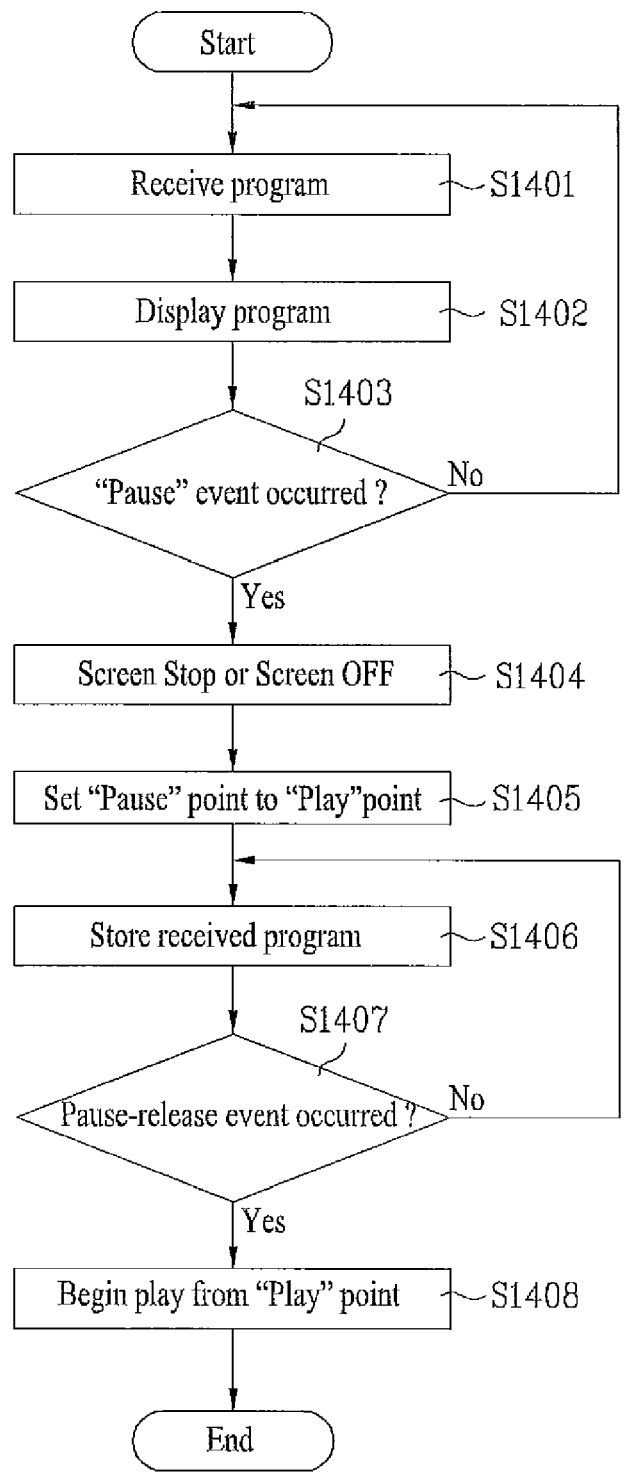
FIG. 21 illustrates a flow chart showing a method for storing a broadcast signal and performing time-difference play according to another embodiment of the present invention.

FIG. 21 illustrates a flow chart showing a method for storing a broadcast signal and performing time-difference play according to another embodiment of the present invention. Referring to FIG. 21, a broadcast signal is received (S1401), the received broadcast signal is outputted to the screen through a display unit 104 (S1402), and then it is determined whether or not a "pause" event occurred (S1403). The "pause" event corresponds to a situation when the display of the program that is currently being received can no longer be continued. For example, this may occur when a pause instruction (or command) is inputted by the user, or when an indirect interruption has occurred. Furthermore, in a receiver that can receiver both broadcast signals and telephone signals, the "pause" event may occur, when an incoming call is received while displaying a received broadcast signal.

When the "pause" event occurs is step 1403, the screen output is turned off, or the output of the screen may be stopped (S1404). Also, the point where the 'pause' event has occurred is newly set as a "playing (or play start)" point (S1405). Thereafter, the program that is received starting from the point where the "pause" event has occurred is stored in the storage medium 151, 152, 751, and 752 of the external storage device. Then, while performing step 1406, the system checks whether or not a "cancel pause" event occurred (S1407). Herein, the "cancel pause" event may occur by inputting a cancel pause key signal, by inputting a play signal, and by any other method that can cancel the pause. The storing of the received program is continued until just before the occurrence of the "cancel pause" event. Then, once the "cancel pause" event occurs, the playing of the program stored in the storage medium is re-initiated starting from the playing point (or play-start point) set up in step 1405 (S1408).

Figure 22:
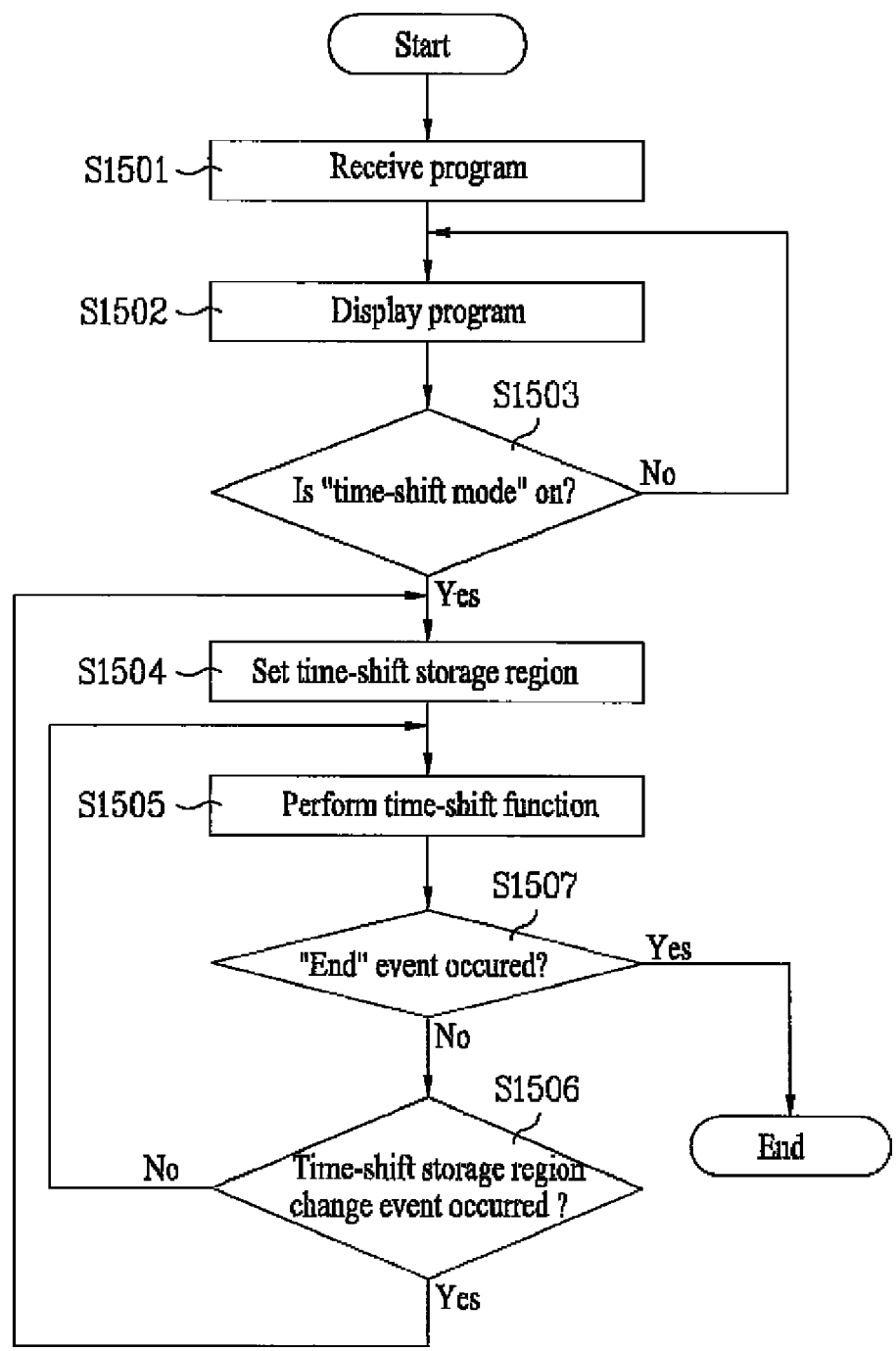
FIG. 22 illustrates a flow chart showing a method for storing a broadcast signal and performing time-difference play according to yet another embodiment of the present invention.

FIG. 22 illustrates a flow chart showing a method for storing a broadcast signal and performing time-difference play according to yet another embodiment of the present invention. Referring to FIG. 22, a broadcast signal (i.e., program) is received (S1501), the received program is outputted to the screen through a display unit 104 (S1502), and then it is determined whether or not a time-shift mode is turned on (S1503). When it is determined in step 1503 that the time-shift mode is turned on, a time-shift storage region of the storage medium 151, 152, 751, and 752 included in the external storage device may be set-up (or determined) (S1504).

The time-shift storage region may be separated from the semi-permanent storage region, so as to be set-up as a temporary storage region. Then, regardless of the available storage capacity in the semi-permanent storage region, when the time-shift mode is turned on, the broadcast signal that is being received can only be stored in the pre-set (or pre-determined) time-shift storage region. Then, when the time-shift storage region becomes full, initially stored broadcast signals are deleted so that newly received broadcast signals can be stored instead. However, when another storage region exists in addition to the pre-determined time-shift storage region, the other storage region may also be flexibly used as another time-shift storage region. Thus, a larger number of broadcast signals may be received and stored.

Settings for the time-shift storage region may be programmed by the user or by a controller within the broadcast receiver. The user may also designate and set-up a specific time-shift storage region. In this case, the units for setting the time-shift storage region may include time, capacity (or size), percentage, and so on. For example, the user may set the time-shift storage region to 1 hour, 2 hours, 5 hours, and so on.

Furthermore, the controller of the broadcast receiver determines available capacity in a storage space other than the time-shift storage region, thereby setting the newly available storage space as another time-shift storage region. For example, when the time-shift storage region is set to 2 hours, and when a storage capacity for 100 hours is available in the semi-permanent storage region, the time-shift storage region may be variably set within the range of 100 hours. For example, in step 1504, the setting of the time-shift storage region may be performed even when the time-shift mode is turned off.

In step 1504, the time-shift function is executed in the time-shift storage region, thereby storing the program currently being received in the time-shift storage region (S1505). Then, when a change in time-shift storage region occurs while storing the received program in the time-shift storage region (S1506), the process returns to step 1504 in order to reset the time-shift storage region, thereby executing the time-shift function. For example, such change may occur when the user inputs a set-up signal for the time-shift storage region, or when a change occurs in a storage space available in the semi-permanent storage region. More specifically, when the storage space available in the semi-permanent storage region is expanded or reduced, settings for the time-shift storage region are renewed, so as to execute the time-shift function. For example, the storage space available in the semi-permanent storage region may be additionally set-up as another time-shift storage region, so as to execute the time-shift function.

In other example, when data are additionally stored in the semi-permanent storage region, while using the storage space available in the semi-permanent storage region, the available space in the semi-permanent storage region may become insufficient. Therefore, in this case, a priority level is assigned to both the original use of the semi-permanent storage region and the use as a time-shift storage region, thereby determining the semi-permanent storage region as the time-shift storage region. For example, when the priority is given to the use of the semi-permanent storage region as a time-shift storage region, the time-shift storage region may be maintained even if the space required for the original use of the semi-permanent storage region (i.e., storing data) is insufficient, thereby preventing other data types from being stored. In this case, a notification message notifying the user that data cannot be stored in the semi-permanent storage region due to its usage as a time-shift storage region. On the other hand, when the priority is given to the original use of the semi-permanent storage region, when the space required for the original use of the semi-permanent storage region (i.e., storing data) becomes insufficient, the time-shift storage region may be reduced and modified. If a "time-shift end" event occurs, or if a "play end" event occurs (S1507), the time-shift function is also terminated (or ended).

Figure 23:
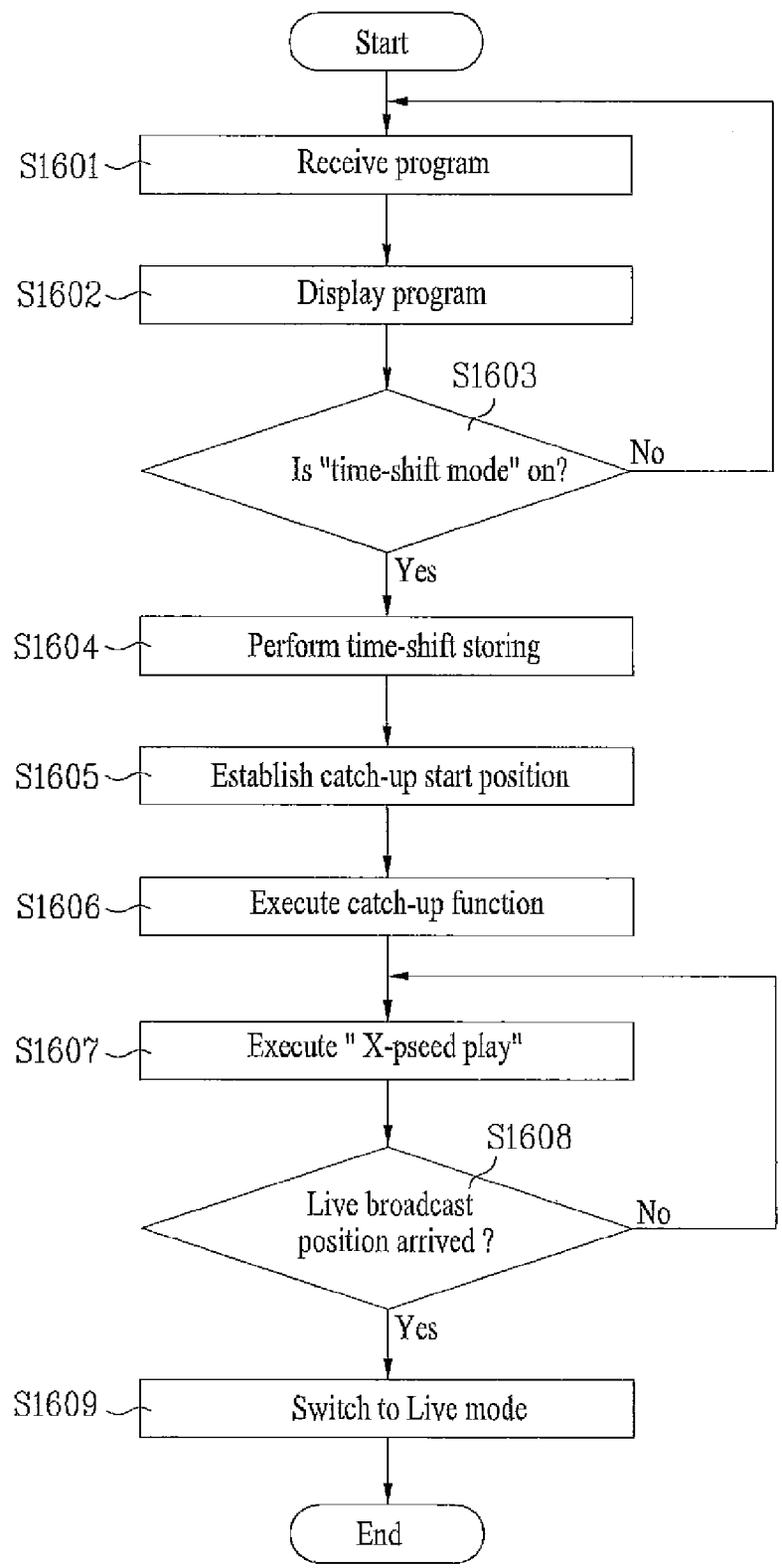
FIG. 23 illustrates a flow chart showing a method for storing a broadcast signal and performing time-difference play according to yet another embodiment of the present invention.

FIG. 23 illustrates a flow chart showing a method for storing a broadcast signal and performing time-difference play according to yet another embodiment of the present invention. Referring to FIG. 23, a broadcast signal (i.e., program) is received (S1601), the received program is outputted to the screen through a display unit 104 (S1602), and then it is determined whether or not a time-shift mode is turned on (S1603). When it is determined in step 1603 that the time-shift mode is turned on, a program that is being received is stored in a time-shift storage region within the storage medium of the external storage device (S1604). The steps of receiving and displaying the broadcast signal and the step of verifying whether or not the time-shift mode is turned on are not limited to the given time order. In other words, the steps may be performed by changing the order of the process steps.

Meanwhile, the program currently being received is stored in the time-shift storage region within the storage medium of the external storage device, and a program already stored in the time-shift storage region may be played from a predetermined position having a time difference with the live program that is currently being received. In this case, when the program already stored in the time-shift storage region is played with a time-difference starting from the predetermined position, and since the live program is also received at the same time, the predetermined time difference may be maintained between the program played from the time-shift storage region and the live program. In this case, the user performs a fast play function on the program that is played with a time difference from the time-shift storage region, so as to catch-up with the live program, thereby being able to view the live program. Hereinafter, in the description of the present invention, the function of fast playing the program stored in the time-shift storage region starting from a predetermined position will be referred to as a "catch-up" function.

Then, in order to execute the catch-up function, when a signal selecting the catch-up function is inputted during the storing of the program in the time-shift storage region, a catch-up start point may be set (S1605). The catch-up start point may be set-up by inputting a control signal. The control signal may be inputted through the process status guide OSD, or may be directly inputted by displaying a control management window, or may be inputted by using a control key. When the catch-up start point is set, the catch-up function is executed (S1606). More specifically, when the catch-up function is executed in step 1606, fast play is performed starting from the catch-up start point (S1607). At this point, while playing the program stored in the time-shift storage region starting from a predetermined position at a normal speed (or rate), the catch-up function may be executed at a specific playing (or playback) point. In this case, the specific playing (or playback) point becomes the catch-up start point, thereby executing fast play at the corresponding point.

When the fast play function is executed, the play speed is faster that the current live program receiving rate. Therefore, the latest receiving point of the live program can be reached. Herein, the playing rate for the catch-up function may be set differently based upon the function settings.

According to an embodiment of the present invention, a default value may be set for the fast play speed, or the settings may be inputted by the user. Furthermore, if the catch-up start point is decided, the fast play speed may also be decided while taking into account the time difference between the live program and the already stored program and the playing time for the catch-up function.

For example, when the user chooses the catch-up function to be executed at a "×2" (or double) speed, a ×2 fast play is performed on the program, which is stored in the time-shift storage region, starting from the catch-up start point. Then, when a predetermined point is reached, the viewer (or user) catches-up with the live program. The settings for the predetermined position may vary depending upon the time difference starting from the catch-up start time to the live program. In this case, instead of inputting the playing time in order to catch up with the reception of the live program, the user inputs the play speed at which the program is to be played for the catch-up function.

In another example, when the time difference starting from the catch-up start time to the live program is 1 hour, the receiver automatically set the play speed to a "×2" (double) speed, so that the receiver can catch up with the live program after 1 hour. In this case, instead of the play speed at which the program is to be played for the catch-up function, the user inputs the playing time in order to catch up with the reception of the live program.

As described above, when fast play is performed on the program stored in the time-shift storage region starting from the catch-up start point, catching-up with the live program is completed when a predetermined point is reached (i.e., when a "live program" position is reached). Therefore, when it is determined that a live program position is reached (S1608), the receiver is converted to a "live" mode (S1609). Then, the live program that is being received from that point is displayed in the "live" mode. At this point, when the time-shift mode function is not turned off, the program being received continues to be stored in the time-shift storage region.

Figure 24:
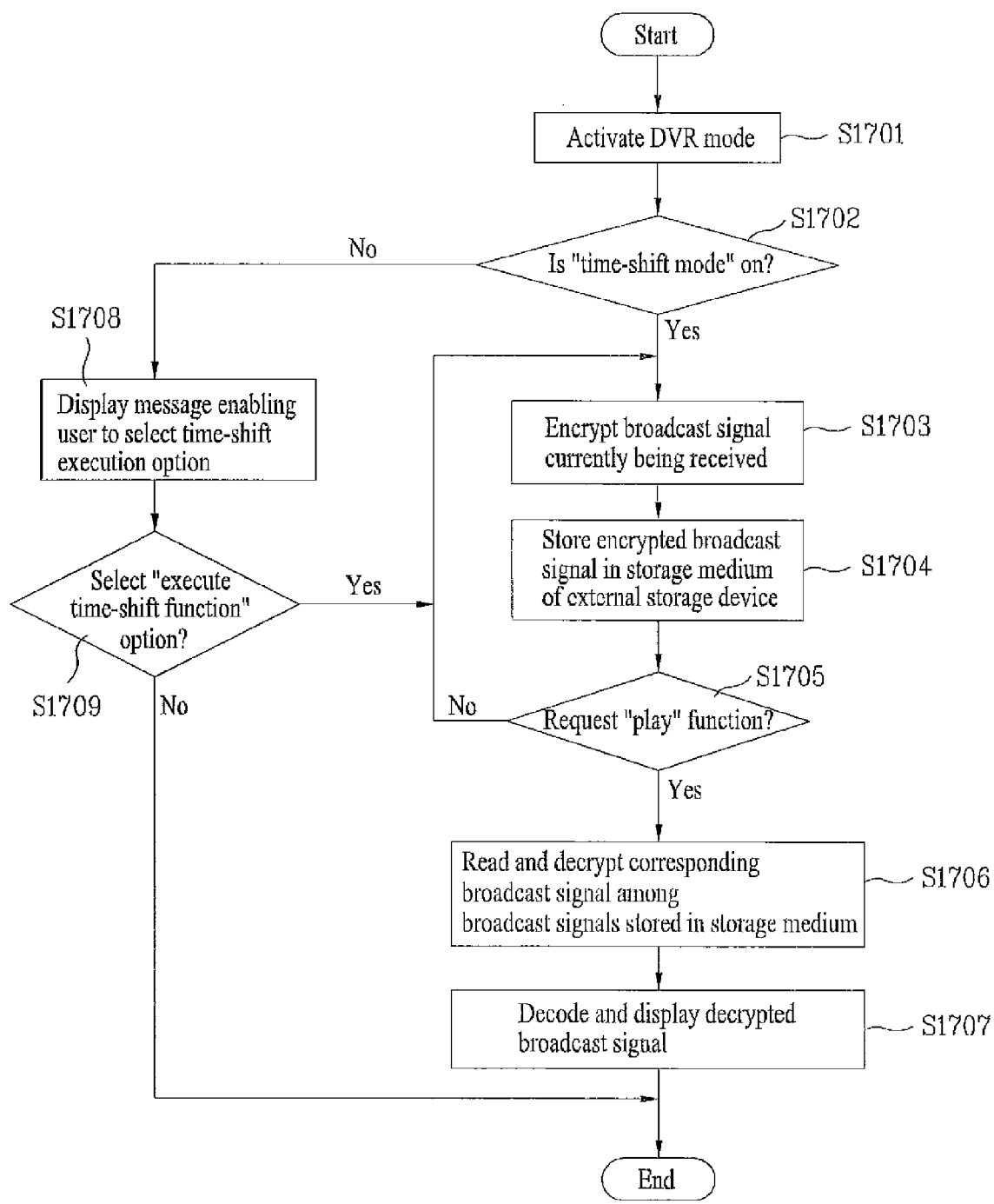
FIG. 24 illustrates a flow chart showing exemplary process steps of time-shift execution among the DVR function operations according to the present invention.

FIG. 24 illustrates a flow chart showing exemplary process steps of time-shift execution among the DVR function operations according to the present invention. More specifically, when the DVR mode is activated (S1701), the receiver verifies whether the time-shift mode is turned on (S1702). When it is verified that the time-shift mode is turned on in step 1702, the receiver encrypts the broadcast signal that is being received (S1703). Then, the encrypted broadcast signal is stored in the time-shift storage region of the storage medium included in the external storage device 150 and 750 (S1704). For example, the encrypted broadcast signal is stored in the time-shift storage region of the storage medium included in the external storage device 150, which is in cable/wireless connection with the broadcast receiver through the USB interface unit 108, or in the external storage device 750, which is in cable/wireless connection with the broadcast receiver through the Ethernet interface unit 720.

When the broadcast signal is stored in the storage medium, the amount of broadcast signals being stored in the time-shift storage region may be indicated, and, at the same time, a time-shift guide bar may be displayed in the form of an OSD. Herein, the time-shift guide bar enables the user to select any one position from the broadcast signals stored in the amount of broadcast signals being stored in the time-shift storage region, so that a corresponding program can be played. At this point, when the user select any one point in the guide bar, the receiver determines that a playback request has been inputted (S1705). Accordingly, the broadcast signal corresponding to the selected point is read from the storage medium and decrypted (S1706). Thereafter, the decrypted broadcast signal is decoded by a corresponding decoding algorithm, thereby being displayed through the display unit (S1707).

Figure 25:
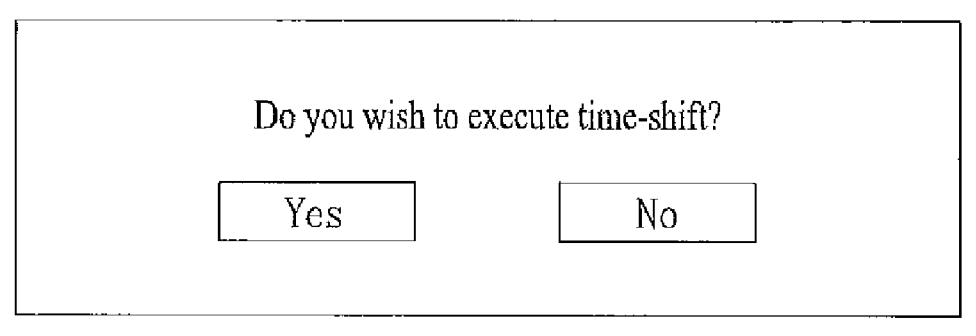

Meanwhile, when the receiver verifies in step S1702 that the time-shift mode is turned off (e.g., an "OFF" setting value is inputted in the time-shift mode sub-menu of FIG. 6A), a message enabling the user to select a time-shift operation status in an OSD format is displayed (S1708). FIG. 25 illustrates an exemplary message for selecting time-shift execution status according to the present invention. More specifically, a message saying "Do you wish to execute time-shift?" is displayed. Then, when the user uses the remote controller to input a 'Yes' option, the time-shift mode is turned on (S1709). Then, the process returns to step 1703 so as to encrypt the broadcast signal that is being received. The process steps following step 1703 is identical to other process steps described above. Therefore, detailed description of the same will be omitted for simplicity. In the description of the present invention, the broadcast signal is stored in the storage medium externally connected to the broadcast receiver and is, then, played. However, in addition to broadcast signals, the present invention may also store (or record) and play diverse moving picture contents, various music files, and other moving picture files generally used in computers.

As described above, the recording/playing device and method for processing a broadcast signal according to the present invention, which can activate a DVR mode and store a broadcast signal that is being received to a broadcast receiver in a storing medium, when the storing medium is externally connected to the broadcast receiver via cable/wireless connection, have the following advantages. Since an expensive storage medium, such as HDD, is not required to be embedded in the broadcast receive, the fabrication cost of the broadcast receiver can be reduced. Thus, a broadcast receiver having a digital video recorder (DVR) function can be supplied to a wide range of users at a relatively low price. Additionally, when a malfunction occurs in the storage medium, the manufacturer of the broadcast receiver is not required to take care of the maintenance of the broadcast receiver. Accordingly, A/S costs can also be reduced. Furthermore, since the storage medium is not required to be fixed inside of the broadcast receiver, the broadcast receiver can be fabricated in a slimmer and more compact size. Finally, since the storage medium can be shifted, moved, and replaced, the storage capacity of the storage medium is no longer limited.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording/playing apparatus comprising:
an external storage device including at least one storage medium; and
a broadcast receiver device, comprising:
a broadcast processor receiving unit capable of demodulating and decoding a received broadcast signal of a specific channel;
an interface unit capable of being connected to the external storage device; and
a record/play controlling unit capable of activating a record/play mode,
wherein when a connection with the external storage device is detected at the interface unit of the broadcast receiver device,
the record/play controlling unit activates the record/play mode to encrypt a decoded broadcast signal and record the encrypted broadcast signal in the storage medium of the external storage device through the interface unit, or
the record/play controlling unit activates the record/play mode to acquire and decrypt a broadcast signal recorded in the storage medium of the external storage device through the interface unit, and play the decrypted broadcast signal via the recording/playing apparatus.

2. The apparatus of claim 1, wherein the interface unit includes a universal serial bus (USB) port capable of being connected to the storage medium of the external storage device, and
wherein the storage medium of the external storage device is capable of being accessed via the USB port through a cable connection, or via a wireless connection.

3. The apparatus of claim 2, wherein each of the interface unit and the external storage device further comprises:
a wireless transceiver capable of wirelessly transmitting and receiving a broadcast signal to or from the other device, when a connection between the external storage device and the broadcast receiver device is detected.

4. The apparatus of claim 1, wherein the interface unit includes a local area network (LAN) card capable of being connected to the external storage device via Ethernet, or a LAN card capable of being connected to the external storage device via a cable connection or a wireless connection.

5. The apparatus of claim 4, wherein each of the interface unit and the external storage device further comprises:
a wireless transceiver capable of wirelessly transmitting and receiving a broadcast signal to or from the broadcast receiver device, when a connection between the external storage device is detected.

6. The apparatus of claim 1, wherein, when the record/play mode is activated and a time-shift mode is turned on, the record/play controlling unit records the demodulated broadcast signal in a time-shift storage region in the storage medium of the external storage device through the interface unit.

7. The apparatus of claim 6, wherein the record/play controlling unit displays a time-shift guide on-screen display (OSD) indicating a status of the demodulated broadcast signal being recorded in the time-shift storage region, and
wherein, when a play-start point is selected from the time-shift guide OSD via an input device, the record/play controlling unit plays a broadcast signal recorded in the time-shift storage region starting from the selected play-start point.

8. The apparatus of claim 1, wherein, when a connection blockage of the storage medium of the external storage device is detected, the record/play controlling unit deactivates the record/play mode.

9. A method for processing a broadcast signal of a recording/playing apparatus, comprising:
receiving a broadcast signal of a specific channel, and demodulating and decoding the received broadcast signal;
activating a record/play mode, when a connection with an external storage device, via a cable connection or a wireless connection, is detected; and
when the record/play mode is activated, encrypting the demodulated broadcast signal and recording the broadcast signal in the external storage device, and playing the decrypted broadcast signal via the recording/playing apparatus.

10. The method of claim 9, wherein the recording/playing of the broadcast signal further comprises:
when the record/play mode is activated and a time-shift mode is turned on, recording the demodulated broadcast signal in a time-shift storage region of the external storage device;
displaying a time-shift guide on-screen display (OSD) indicating a status of the demodulated broadcast signal being stored in the time-shift storage region; and
when a play-start point is selected from the time-shift guide OSD through an input device, reading and playing the broadcast signal stored in the time-shift storage region starting from the selected play-start point.

11. The method of claim 9, wherein the recording/playing the broadcast signal further comprises:
when a connection blockage of the external storage device is detected, deactivating the record/play mode.

* * * * *